United States Patent [19]
Blevins

[11] Patent Number: 5,093,773
[45] Date of Patent: Mar. 3, 1992

[54] PROCESSING SYSTEM WITH HEAT RECOVERY

[75] Inventor: Terrence L. Blevins, Round Rock, Tex.

[73] Assignee: Fisher Controls International, Inc., Clayton, Mo.

[21] Appl. No.: 420,776

[22] Filed: Oct. 12, 1989

[51] Int. Cl.$^5$ .......................... G05B 13/02; D21C 7/12
[52] U.S. Cl. ..................................... 364/143; 364/471; 364/502; 162/238
[58] Field of Search ................ 364/469, 471, 510, 564, 364/500, 148, 502, 575; 162/DIG. 10, 238, 252, 263, 39, 219, 253

[56] References Cited

U.S. PATENT DOCUMENTS

| | | | |
|---|---|---|---|
| 2,466,290 | 4/1949 | Wells | 92/13 |
| 3,589,980 | 1/1968 | Salomon | 162/DIG. 10 |
| 4,141,784 | 2/1979 | Lofkrantz et al. | 364/173 |
| 4,332,507 | 6/1982 | Wakamori et al. | 364/152 |
| 4,358,821 | 11/1982 | Niemi | 364/152 |
| 4,386,623 | 6/1983 | Funk et al. | 364/148 |
| 4,551,796 | 11/1985 | Singh | 364/148 |
| 4,578,149 | 3/1986 | Fagerlund | 162/39 |
| 4,683,841 | 8/1987 | Andersson et al. | 122/22 |
| 4,849,052 | 7/1989 | Grant | 162/39 |
| 4,978,425 | 12/1990 | Beller et al. | 364/471 |

FOREIGN PATENT DOCUMENTS 919289  1/1973  Canada ..................................... 341/35
982252  1/1976  Canada .
2177067 11/1973 France .

OTHER PUBLICATIONS

Swift et al., "Rapid Displacement Heating in Batch Digesters", (no date).
Ryynanen et al., "Management System For Liquor Recycling of RDH Digester House", 1987.
Quote #1: pp. 1, 5, 90-113.
Quote #2: pp. 149, 151-154.

*Primary Examiner*—Jerry Smith
*Assistant Examiner*—Paul Gordon
*Attorney, Agent, or Firm*—Marshall, O'Toole, Gerstein, Murray & Bicknell

[57] ABSTRACT

A processing system utilizing heat recovery has a plurality of digesters in which products such as wood chips may be reacted at high temperature and pressure to form pulp suitable for use in the manufacture of paper. The digesters are fluidly connected to a plurality of heat recovery tanks including a cool liquor tank, a warm liquor tank, and a hot liquor tank. The digesters are also fluidly connected to a displacement tank which periodically supplies fluid to the digesters for the purposes of displacing their contents. The fluid levels within the heat recovery tanks and within the displacement tank are automatically controlled. In processing, predetermined volumes of cool and hot liquor are periodically pumped to each digester as well as automatically determined volumes of warm liquor and displacement fluid.

27 Claims, 22 Drawing Sheets

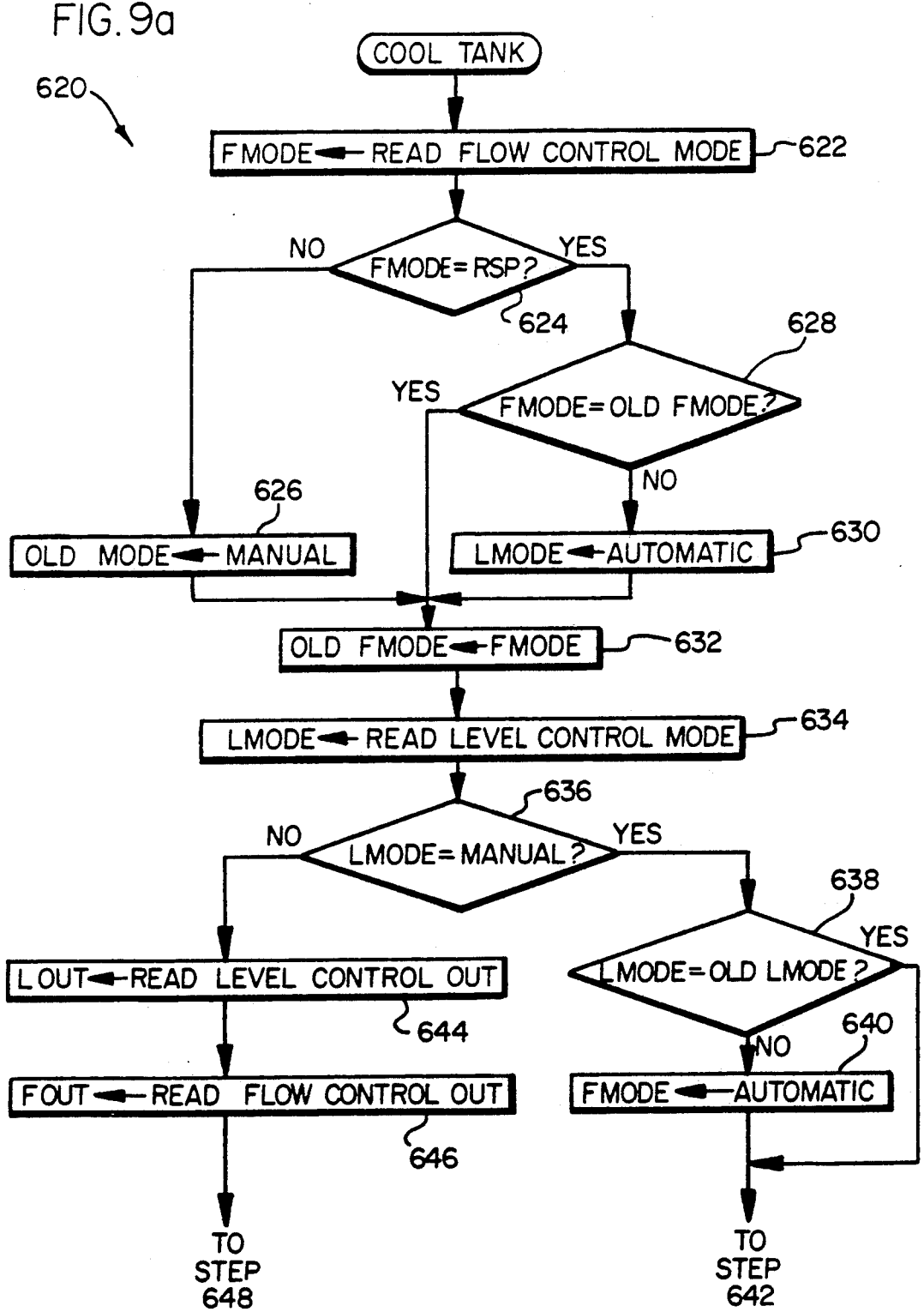

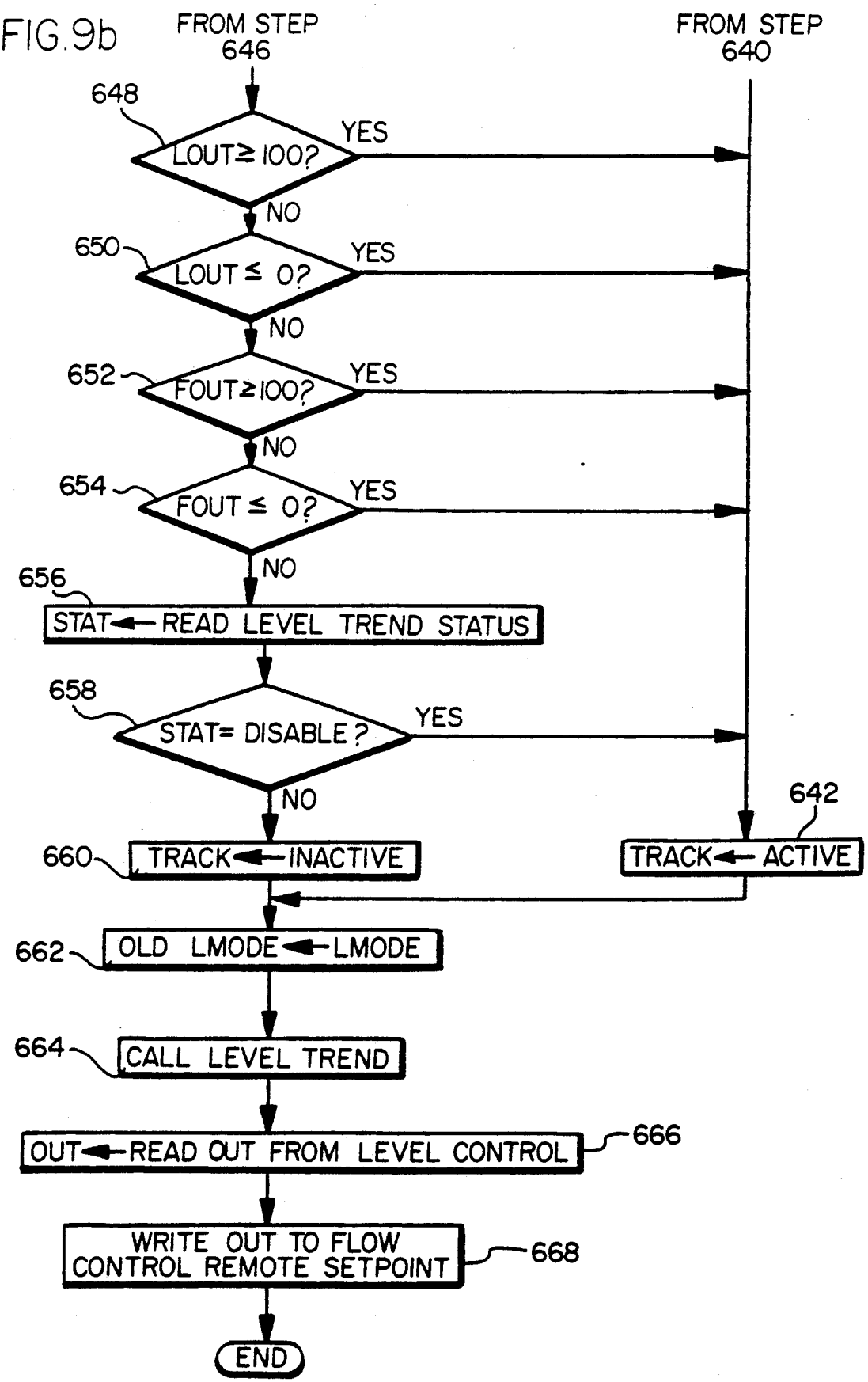

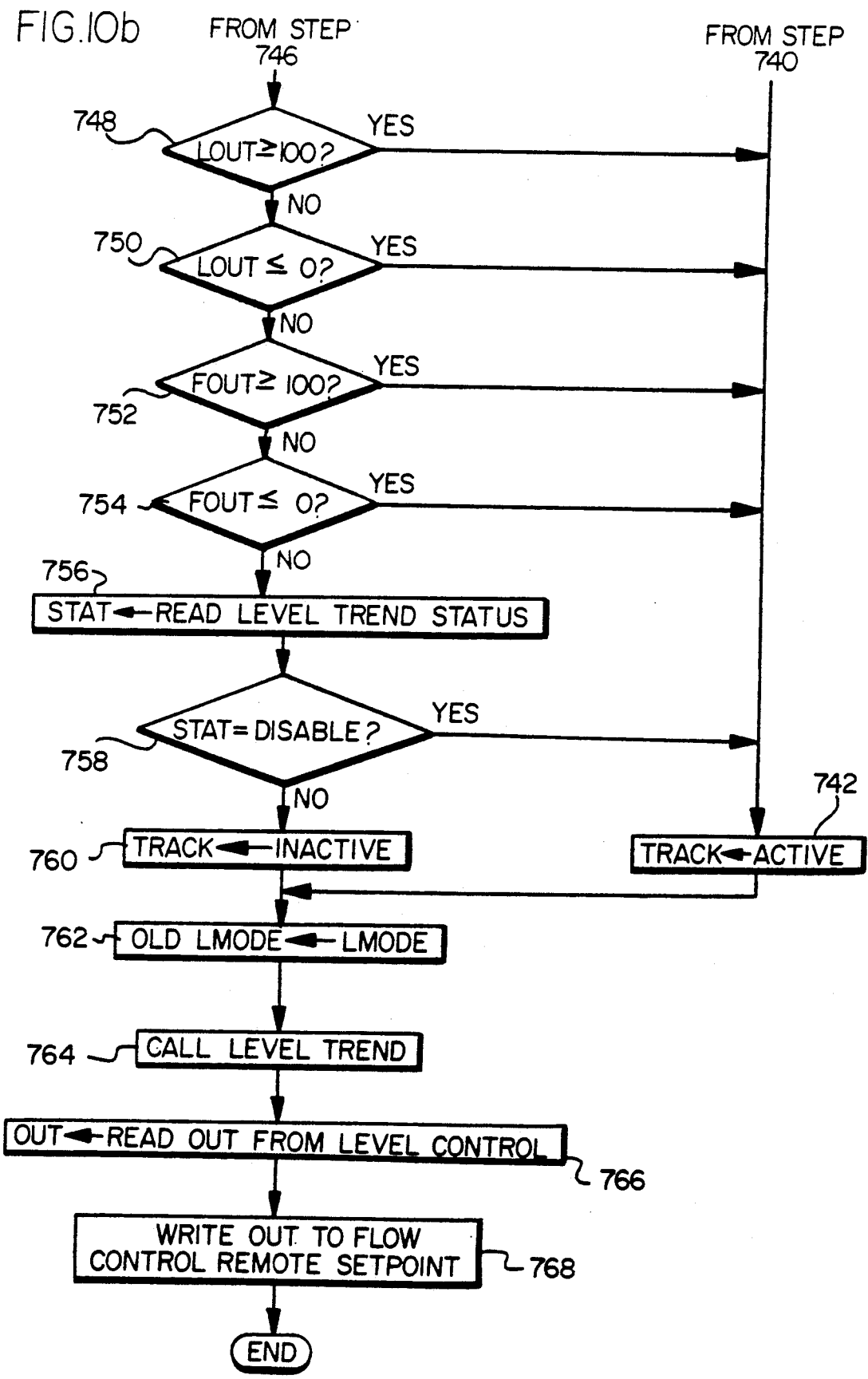

PROCESSING SYSTEM WITH HEAT RECOVERY

BACKGROUND OF THE INVENTION

The present invention relates generally to processing systems utilizing heat recovery, and more particularly to a processing system with heat recovery used in the chemical processing of wood chips into pulp for the production of paper.

Many types of processing systems exist for the production of various chemicals, products, consumer goods, etc. One example of such a processing system is a chemical processing system for converting wood chips into pulp used in the manufacture of paper. Wood chips are essentially cellulose bound together by lignin. To convert the wood chips into pulp, the lignin is chemically broken down by subjecting the chips to chemical solutions at high temperatures and pressures in large tanks referred to as digesters. This is a heat-intensive process which consumes much energy.

Previous systems for chemically processing wood chips into pulp have attempted to minimize the energy costs associated with operating the system by using heat recovery to recapture and reuse the heat generated in the process. Such a system is described in an article entitled, "Management System for Liquor Recycling of RDH Digester House," by Ryyn e,uml/a/ nen, et al. That system conserves energy by using multiple tanks for storing and reusing chemical solutions, or liquors, that were originally heated in the digesters. Although desirable to conserve energy, the use of heat recovery systems using multiple tanks complicates the control system responsible for controlling the fluid flows among the tanks and digesters and the fluid levels within the various tanks and digesters. The authors of the above article recognized this problem of coordinating the control of the tanks and digesters, noting that process disturbances would upset the control and require immediate corrections. The ramifications of upsets due to process variations and scheduling problems among a plurality of digesters include reduced pulp output and/or damaged pulp.

SUMMARY OF THE INVENTION

The invention provides for automatic control of the processing system to accommodate process variations and to ease the burden on the operator of the system.

One feature of the invention is the automatic determination of fluid volumes used in the processing system. In one embodiment of the invention utilizing this feature in the context of a pulp processing system, the system includes a plurality of digesters in which wood chips are reacted at high temperature and pressure to form pulp and a plurality of heat recovery tanks fluidly connected to the digesters. The heat recovery tanks may include a hot liquor tank containing relatively hot fluid generally at a first temperature, a warm liquor tank containing fluid generally at a second temperature the second temperature being lower than the first temperature, and a cool liquor tank containing fluid generally at a third temperature, the third temperature being lower than the second temperature. A displacement tank may also be fluidly connected to the digesters. The displacement tank periodically supplies fluid to the digesters to displace the fluid within them after the processing within the digesters has substantially transformed the wood chips into pulp. The system also includes means for automatically determining a fluid volume to be transferred from one of the tanks to one of the digesters and means for causing the automatically determined fluid volume to be transferred from the one tank to the one digester.

Another feature of the invention is the automatic control of the fluid levels within one or more of the tanks within the processing system. In one embodiment of the invention incorporating this feature, the processing system includes a digester and a plurality of heat recovery tanks including a hot liquor tank, a warm liquor tank, and a cool liquor tank. The hot and warm liquor tanks are fluidly interconnected, and the processing system includes a controller that automatically determines the non-instantaneous trend of the fluid level within the hot liquor tank and controls the hot liquor tank fluid level based upon the non-instantaneous trend. The fluid level may be controlled by automatic adjustment of the fluid flow from the hot liquor tank to the warm liquor tank. The automatic control of the fluid level may be based factors in addition to the non-instantaneous trend of the fluid level within the hot liquor tank. The non-instantaneous trend of the fluid level may be determined by comparing a fluid level error determined at a first time with a fluid level error determined at a second later time.

Another feature of the invention is the automatic control of the fluid level within a tank based upon the average fluid level within the tank over time. A method incorporating this feature of the invention includes taking a plurality of measurements of the fluid level of the tank over a first predetermined period of time. Based upon these measurements, a fluid level average is determined over the first predetermined period of time. These two steps are repeated to determine a plurality of fluid level averages. Then, the average fluid level of the tank over a second predetermined period of time, longer than the first predetermined period of time, is determined based upon, the fluid level averages previously determined. The average target fluid level within the tank over the second predetermined period of time is determined, and then the difference between the average fluid level and the average target level is determined. Finally, the fluid level within the tank is controlled based upon the difference between the average fluid level and the average target level.

These and other features of the present invention will be apparent to those of ordinary skill in the art in view of the detailed description of the preferred embodiment, which is made with reference to the drawings, a brief description of which is provided below.

BRIEF DESCRIPTION OF THE DRAWINGS

FIGS. 9a and 9b are flow charts of a cool liquor tank control routine of the processing system;

FIGS. 10a and 10b are flow charts of a warm liquor tank control routine of the processing system;

DETAILED DESCRIPTION OF THE PREFERRED EMBODIMENT

Figure 1A:
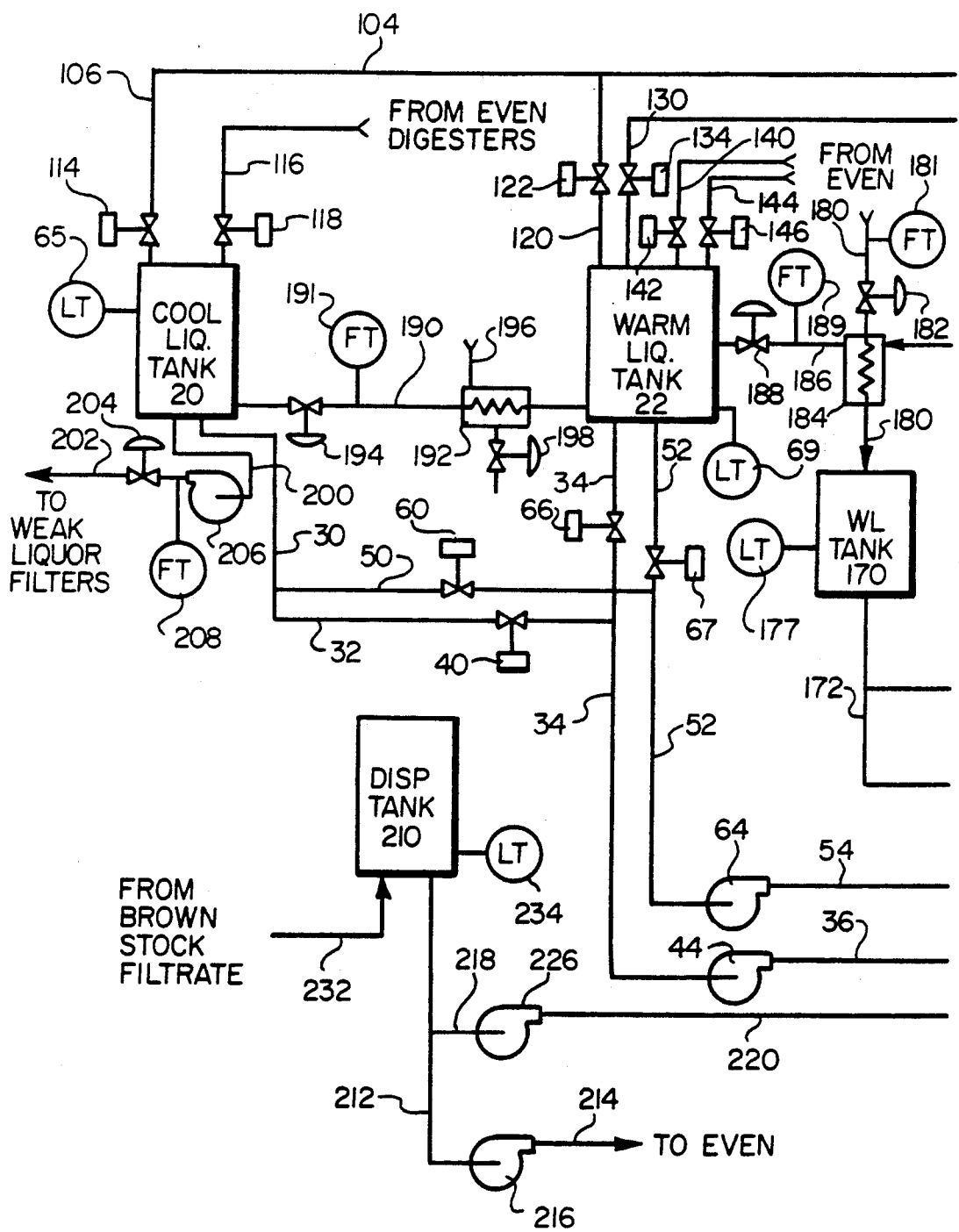
FIG. 1(a) and 1(b) illustrate the hydraulic portion of a preferred embodiment of a processing system.
Figure 1B:
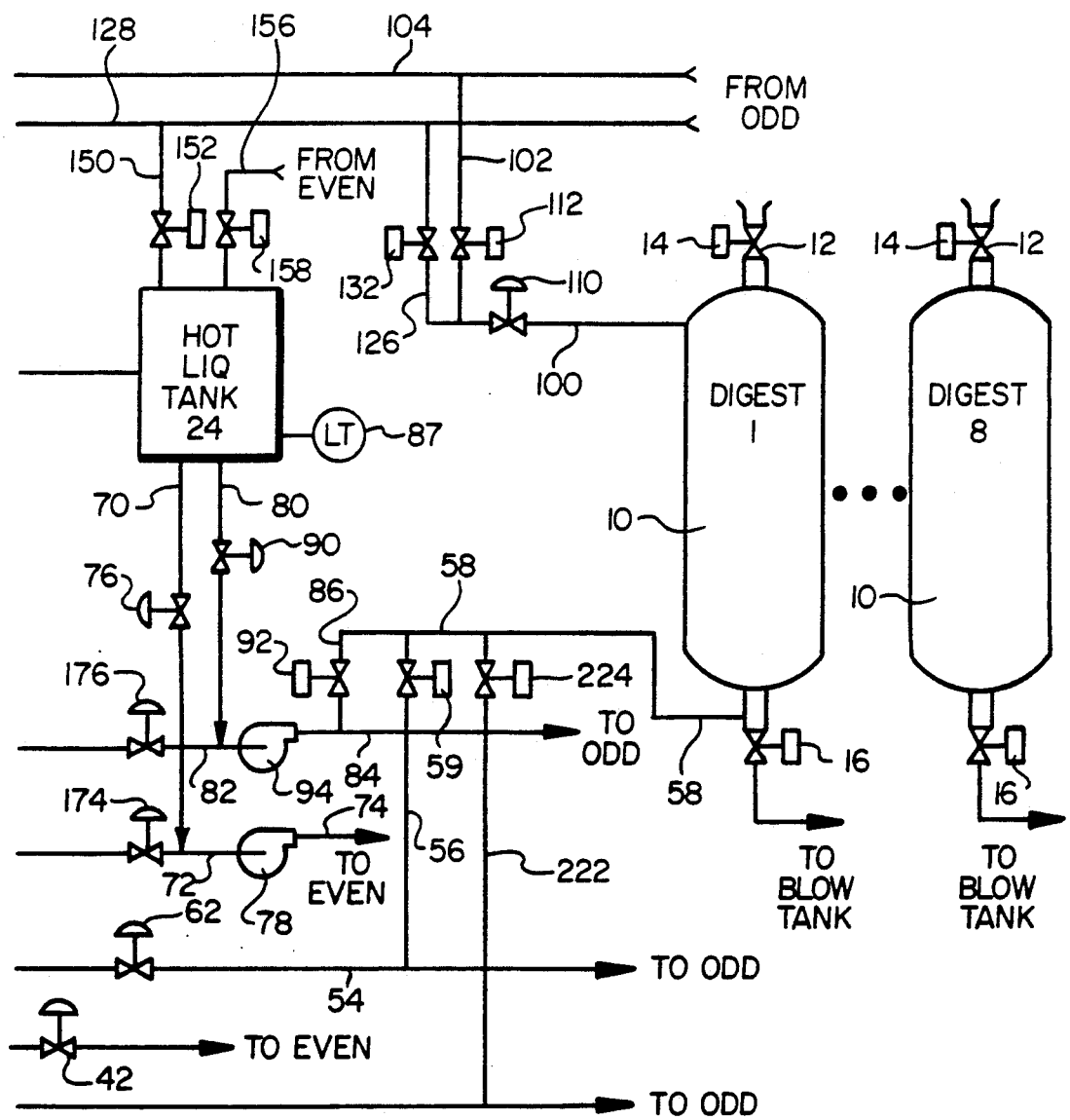

A preferred embodiment of the hydraulic portion of the processing system is shown in FIGS. 1a and 1b. The hydraulic system includes a plurality of digesters 10 in which wood chips or other products are subjected to chemicals at high temperature and pressure to transform the chips into pulp. While only two digesters 10 are shown in FIG. 1b for purposes of simplicity, a plurality of such digesters, for example eight, are typically used. The digesters 10 are divided into two groups, even-numbered digesters and odd-numbered digesters, on the basis of assigned numbers. The fluid capacity of each of the digesters is approximately 60,000 gallons (227,100 liters).

Each digester 10 has a capping valve 12 at its top for the introduction of wood chips or products. The capping valve 12 has a valve actuator represented by a rectangle 14. In FIGS. 1a and 1b valves which have rectangular valve actuators are blocking valves which have only two valve positions, either open or closed, whereas valves shown with semicircular valve actuators are variably adjustable throttling valves which precisely control flow. Each digester 10 has a blow valve 16 at its bottom through which the pulp or other product is ejected after the processing in the digester is completed. The blow valve 16 leads to a blow tank (not shown) which is connected to a washer system (not shown) for washing the pulp or product.

Processing fluids are supplied to the digesters 10 from a number of tanks, including a cool liquor tank 20, a warm liquor tank 22, and a hot liquor tank 24. These tanks 20, 22, 24 serve as heat recovery tanks to recover the heat used in the digester processing. The term "liquor" as used herein refers only generally to processing fluids and is not intended to be limited to any particular processing fluid. In the processing of wood chips, the liquor will generally consist of water with various concentrations of sodium hydroxide and small amounts of sodium sulfide as a buffer. The concentrations of the liquors within the cool, warm and hot liquor tanks typically vary.

The temperature of the fluid within the hot liquor tank 24 is generally about 310° F. (154.4° C.); the temperature of the fluid within the warm liquor tank 22 is generally about 240° F. (115.6° C.); and the temperature of the fluid within the cool liquor tank 20 is generally about 180° F. (82.2° C.).

The cool, warm and hot liquor tanks 20, 22, 24 are fluidly connected to the digesters 10 to supply the liquor to the digesters 10 that is necessary for the chemical processing. The cool liquor tank 20 is fluidly connected to and supplies fluid to the even-numbered digesters 10 by a flow path partially shown as comprising a number of pipeline or conduit portions 30, 32, 34, 36. A blocking valve 40 is connected to control the flow of cool liquor through the conduit 32, and a throttling valve 42 regulates the flow of liquor through the conduit 36. A pump 44 is connected between the conduit portions 34, 36. Cool liquor is supplied from the cool liquor tank 20 to the odd digesters 10 by way of a fluid flow path including conduit portions 30, 50, 52, 54, with conduit portions 56, 58 supplying cool liquor to digester #1. A blocking valve 60 controls the flow through conduit 50, and a throttling valve 62 controls the flow through conduit 54. A pump 64 is connected between the conduits 52, 54. A blocking valve 59 controls the fluid flow within the conduit 56. The fluid level within the cool liquor tank 20 may be measured by a level transducer 65.

The warm liquor tank 22 supplies fluid to the even digesters 10 by the conduits 34, 36, and a blocking valve 66 controls the flow within the conduit 34. Warm liquor is supplied to the odd digesters 10 by the fluid path comprising conduit portions 52, 54, with the conduit portions 56, 58 supplying warm liquor to digester #1. A blocking valve 67 controls the flow within the conduit 52. The fluid level within the warm liquor tank 22 may be measured by a level transducer 69.

The hot liquor tank 24 supplies fluid to the even digesters 10 by conduit portions 70, 72, 74. A throttling valve 76 controls the flow through the conduit 70, and a pump 78 is connected between conduit portions 72 and 74. Hot liquor is supplied to the odd digesters 10 by a fluid path comprising conduit portions 80, 82, 84, with the conduit portions 86, 58 supplying hot liquor to digester #1. A throttling valve 90 controls the flow within conduit 80, and a blocking valve 92 controls the flow within the conduit 86. A pump 94 is connected between the conduits 82 and 84. The fluid level within the hot liquor tank 24 may be measured by a level transducer 87.

The cool, warm and hot liquor tanks 20, 22, 24 are fluidly connected to the digesters 10 to receive liquor from the digesters after the processing in the digesters is completed. The cool liquor tank 20 receives fluid from the odd digesters 10 via a flow path comprising conduit portions 104, 106, with the conduit o portions 100, 102 supplying liquor from digester #1. A throttling valve 110 controls the flow through conduit 100, a blocking valve 112 controls the flow through conduit 102, and a blocking valve 114 controls the flow through conduit 106. The cool liquor tank 20 receives fluid from the even digesters 10 by way of a fluid flow path comprising a conduit portion 116 controlled by a blocking valve 118.

The warm liquor tank 22 may receive fluid from the odd digesters 10 via two separate fluid flow paths. One flow path comprises the conduits 104, 120, and conduits 100, 102 for digester #1. A blocking valve 122 controls the flow within conduit 120. The second flow path includes the conduit portions 128, 130, and conduit portions 100, 126 for digester #1. A blocking valve 132 controls the flow within conduit 126, and a blocking valve 134 controls the flow within conduit 130. The warm liquor tank 22 receives fluid from the even digesters 10 by a first flow path including a conduit 140 controlled by a valve 142 and a second flow path including a conduit 144 controlled by a valve 146.

The hot liquor tank 24 receives fluid from the odd digesters 10 via a flow path comprising conduit portions 128, 150 and conduit portions 100, 126 for digesters #1. The flow through the conduit portion 150 is controlled by a blocking valve 152. The hot liquor tank 24 receives fluid from the even digesters 10 via a conduit 156 controlled by a blocking valve 158.

A white liquor accumulator tank 170 supplies a white liquor comprising sodium hydroxide solution of relatively high concentration to the digesters 10. The white liquor is supplied to the even digesters 10 via a flow path comprising the conduit portions 172, 72, and 74, with a throttling valve 174 controlling the flow within the conduit 72. The white liquor is supplied to the odd digesters 10 via a flow path including the conduit portions 172, 82, 84, with conduit portions 86 and 58 supplying digester #1. The flow through the conduit portion 82 is controlled by a throttling valve 176. The fluid level within the white liquor tank 170 may be measured by a level transducer 177.

White liquor is supplied to the white liquor accumulator 170 via a conduit 180 controlled by a throttling valve 182. The fluid flow through the conduit 180 may be measured by a flow transducer 181. The conduit 180 passes through a heat exchanger 184 which causes the white liquor to be preheated prior to its being supplied to the accumulator 170. Heating of the white liquor is caused by hot liquor flowing from the hot liquor tank 24 to the warm liquor tank 22 via a conduit 186 which also passes through the heat exchanger 184. The flow of the hot liquor within the conduit 186, and thus the amount of heat transferred from the hot liquor to the white liquor, is controlled by a throttling valve 188. The fluid flow within the conduit 186 may be measured by a flow transducer 189.

The warm liquor tank 22 is connected to the cool liquor tank 20 via a conduit 190 which passes through a heat exchanger 192 and is controlled by a throttling valve 194. The fluid flow through the conduit 190 may be measured by a flow transducer 191. A conduit 196 controlled by a throttling valve 198 also passes through the heat exchanger so that heat is transferred from the warm liquor flowing through the conduit 190 to the fluid flowing through the conduit 196, which may be cooling water for example.

The cool liquor tank 20 has two conduit portions 200, 202 which provide cool liquor from the tank 20 to a plurality of weak liquor filters (not shown). The weak liquor filters are used to recycle the cool liquor. A throttling valve 204 controls the flow through the conduit 202, and a pump 206 is connected between the conduits 200, 202. The fluid flow through the conduit 202 may be measured by a flow transducer 208.

The hydraulic processing system also includes a displacement tank 210. After the completion of the reaction within each digester 10, the fluid contents of the digester are displaced by supplying fluid from the displacement tank 210 to the bottom of the digester 10, with the displaced fluid being channeled to either the hot or warm liquor tanks 24, 22, respectively. The displacement fluid is supplied from the displacement tank 210 to the even digesters 10 via a flow path including a pair of conduit portions 212 and 214 interconnected by a pump 216. The displacement fluid is supplied to the odd digesters 10 via a flow path including the conduit portions 212, 218, 220, with conduit portions 222 and 58 supplying digester #1. The flow through the conduit portion 222 is controlled by the blocking valve 224. The conduit portions 218 and 220 are interconnected by a pump 226.

Displacement fluid is supplied to the displacement tank 210 from a brown stock filtrate tank (not shown). The filtrate tank is supplied by the fluid extracted from the pulp by the washers (not shown) briefly mentioned above. Fluid is supplied from the filtrate tank to the displacement tank 210 via a conduit portion 232. The fluid level within the displacement tank 210 may be measured by a level transducer 234.

Figure 2:
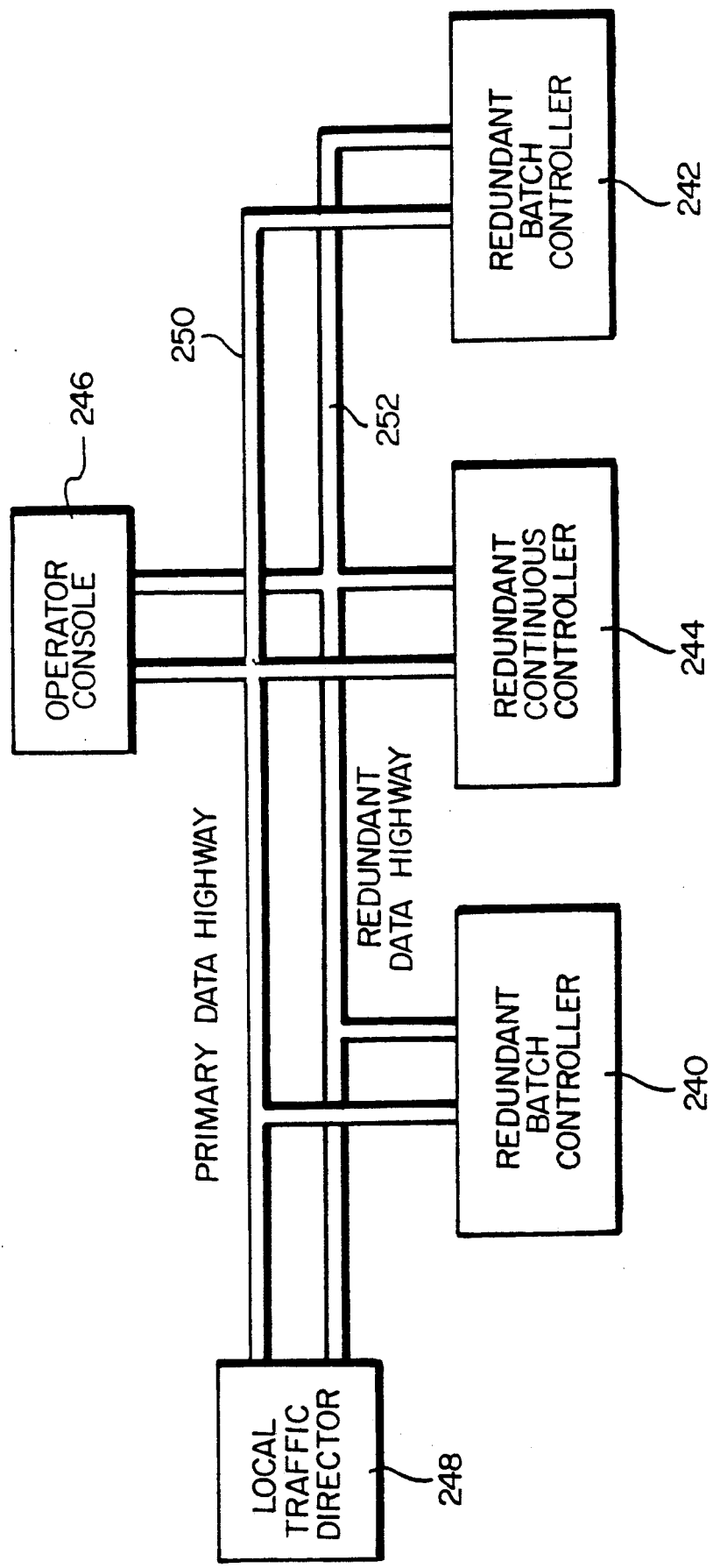
FIG. 2 illustrates the electronics which controls the hydraulic portion of the processing system of FIG. 1.

The electronics portion of the processing system is shown in FIG. 2. This portion of the system includes a first redundant batch controller 240 for controlling the basic operation of the even-numbered digesters, and a second redundant batch controller 242 for controlling the basic operation of the odd-numbered digesters. A redundant continuous controller 244 controls the portion of the hydraulic system relating to the control of the fluid levels within the tanks 20, 22, 24, 170, 210 and the fluid flow between among the tanks 20, 22, 24, 170. In particular, the controller 244 is connected to each of the five, level transducers 65, 69, 87, 177, 234 of FIGS. 1a and 1b and each of the four flow transducers 181, 189, 191, 208 of FIG. 1a. The controller 244 is connected to and controls the four valve actuators 82, 188, 194, 204 which control the rate of flow among the tanks 20, 22, 24., 170. The remaining pumps and valve actuators of FIGS. 1a and 1b are connected to one of the two batch controllers 240, 242. The three controllers 240, 242, 244 are conventional controllers commercially available from Fisher Controls International, Inc.

The three controllers 240, 242, 244 are connected to an operator console 246 and a local traffic director 248 by a primary data highway 250 and a redundant data highway 252. The local traffic director 248, which is conventional and commercially available from Fisher Controls International, Inc., controls the flow of data among the controllers 240, 242, 244 and the operator console 246. The overall operation of the electronic system is redundant to prevent catastrophic failure of the system. To this end, each of the controllers 240, 242, 244 and the operator console 246 is redundant and has a duplicate set of electronic boards inside, and the redundant data highway 252 is duplicated to provide a secondary communication link among the controllers 240, 242, 244 and the console 246. The particular configuration of the electronic portion of the system shown in FIG. 2 is not considered to be part of the invention, and could be varied in many ways while still using the principles of the invention.

Operation

During operation of the system, each of the digesters 10 is operated in a batch-processing mode in which each digester produces a batch of pulp during each of its production cycles. The production cycles of the digesters are staggered so that the digesters do not perform the same operational steps at the same time.

The following basic steps are performed by one of the batch controllers 240, 242, depending upon whether an even-numbered digester or an odd-numbered digester is being processed. These steps, which are described in connection with the odd digester 10 shown in FIG. 1b, digester #1, are performed during each production cycle of each digester. Now referring to FIG. 3, at step 400 digester #1 is loaded with a measured amount of wood chips through the capping valve 12. At step 402 a predetermined volume, which may be 10,000 gallons for example, of cool liquor is then supplied to digester #1 from the cool liquor tank 20 through the valves 60, 62, 59. At step 404, an automatically determined volume of warm liquor is then provided to digester #1 from the warm liquor tank 22 via the valves 67, 62, 59, with any excess fluid flowing from the top of digester #1 to the cool liquor tank 20 via the valves 110, 112, 114. The manner in which the warm liquor volume is automatically determined is an important feature of the invention, and is described in more detail below.

At this point, the digester 10 is hydraulically filled, or completely filled with fluid. Thus, any additional fluid volume added will require excess fluid of a generally equal volume to be removed from the digester 10 via the conduit 100.

After the warm liquor has been added, at step 406 a first predetermined volume of hot liquor is provided to digester #1 from the hot liquor tank 24 via the valves 90, 92, with any excess fluid flowing from the top of the digester 10 to first the warm liquor tank 22 via the valves 110, 112, 122, and then the hot liquor tank 24 via the valves 110, 132, 152. At step 408, a predetermined volume of white liquor is provided to digester #1 from the white liquor accumulator 170 via the valves 176, 92, with the excess digester fluid flowing to the hot liquor tank 24 via the valves 110, 132, 152. At step 410, a second predetermined volume of hot liquor is provided to digester #1 from the hot liquor tank 24, with the excess digester fluid flowing from the digester 10 back into the hot liquor tank 24.

At this point the fluid temperature of the digester is approximately 280–300° F. (137.8–148.9° C.), while the temperature desirable for the lignin-removal reaction is approximately 340° F. (171.1° C.). To further increase the temperature, at step 412 the digester fluid is heated by a heating network (not shown) which pulls fluid from the middle portion of the digester 10, heats it, and returns the fluid to the top and bottom ends of the digester. In addition to heating the digester fluid, this mixes the digester fluid so that the white liquor becomes evenly distributed within the digester. This cooking process continues for a certain period of time, 80 minutes for example, at which point the reaction is substantially completed and the wood chips have been substantially transformed to pulp.

At step 414, the contents of the digester are displaced by fluid from the displacement tank 210 for two basic reasons. First, since a basic goal of the processing system is to conserve heat energy, the hot digester contents are displaced to the hot liquor tank 24 so that heat is conserved within the system. The fluid in the hot liquor tank 24 is then reused for subsequent processing.

Second, the fluid from the displacement tank 210 cools the pulp within the digester to stop the cooking process and performs an initial washing function to wash from the pulp the relatively strong sodium hydroxide solution of the mixture of the white and hot liquors. The fluid stored in the displacement tank 210 is recovered from a washing step performed after the pulp has been blown from the digester. Fresh water is used to wash the pulp, and then the wash water flows to the brown stock filtrate tank, which supplies the displacement tank 210. The wash water has a much lower sodium hydroxide concentration than the digester fluid in which the wood chips are cooked, and it has been found to be advantageous to supply as much fluid from the displacement tank 210 as possible to the digester 10 after the cooking step so that the pulp is as clean as possible prior to its being washed with fresh water. Using greater volumes of displacement fluid to wash the pulp within the digester reduces the amount of fresh water necessary in the post-blow washing.

The volume of displacement fluid transmitted to the digester subsequent to the cook step is automatically determined by the processing system. The automatic displacement volume determination is an important feature of the invention which is described in more detail below. The displacement fluid is pumped to digester #1 via the valve 224, a first volume of the hot fluid within the digester is displaced to the hot liquor tank 24 and then the remaining volume of displaced to the warm liquor tank 22.

Finally, at step 416 the contents of the digester 10, including the pulp and displacement fluid, are blown to a blow tank (not shown) by compressed air from a pressurized air tank (not shown), thus leaving the digester empty for the next processing cycle.

During the operation of the processing system, a plurality of digesters, for example eight digesters, will be continuously operating. The operation of the digesters will cause the fluid levels within each of the cool, warm and hot liquor tanks 20, 22, 24 and displacement and white liquor accumulator tanks 210, 170 to continuously vary.

The fluid level in each tank will vary in a similar manner during each cycle time. The "cycle time" is the amount of time required for the processing system to produce one digester batch of pulp. The cycle time is determined by dividing the time required for a single digester to produce a batch of pulp by the number of digesters in the system. For example, if each digester requires 200 minutes to make a batch of pulp, and there are eight digesters, the cycle time would be 25 minutes. In such an eight-digester system, the operation of each digester would be staggered by the cycle time, or 25 minutes. As a result, the system would produce a batch of pulp every 25 minutes.

This staggering of the digester operation evens out the fluid demands within the system. If the operation of the digesters were not staggered, all the digesters in the system would have to be filled and drained at the same times, and thus would require very large fluid tanks. By staggering the operation, the fluid tanks can be much smaller in size. Such staggered operation of digesters is routinely performed and is conventional.

FIGS. 4a through 4e illustrate the variance with time of the various fluid levels within the tanks for two cycle times, each cycle time being designated "H." FIGS. 4a through 4e are intended only to conceptually illustrate the variance of the fluid levels, and are not intended to represent actual fluid level versus time graphs.

Figure 4A:
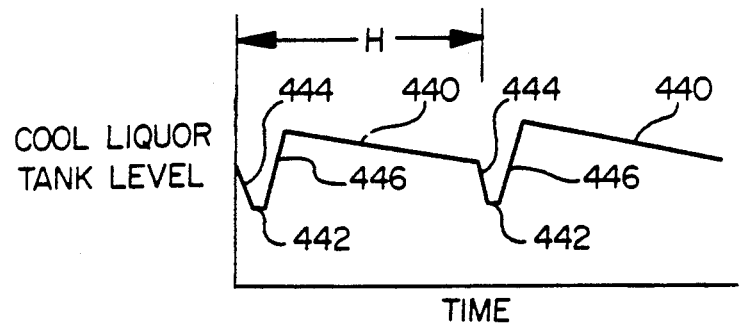
FIGS. 4a to 4e illustrate the fluid levels versus time for various tanks i the processing system.

Now referring to FIG. 4a, throughout each cycle, the fluid level within the cool liquor tank 20 slowly decreases with time as indicated by the downwardly sloping portions 440, 442. This gradual fluid level decrease is due to fluid flowing from the cool liquor tank 20 to the weak liquor filters through the pump 206 and the valve 204. The fluid level within the cool liquor tank 20 can be controlled by adjusting this flow rate.

In addition to the fluid level change due to this gradual flow, there are two relatively sharp fluid level changes during each cycle. A sharp level decrease represented by the portions 444 is due to the step 402 of FIG. 3 during which the predetermined volume of cool liquor is added to one of the digesters. This predetermined cool liquor volume is preferably constant for each of the digesters, and thus the size of the portion 444 for each cycle would be the same.

Figure 3:
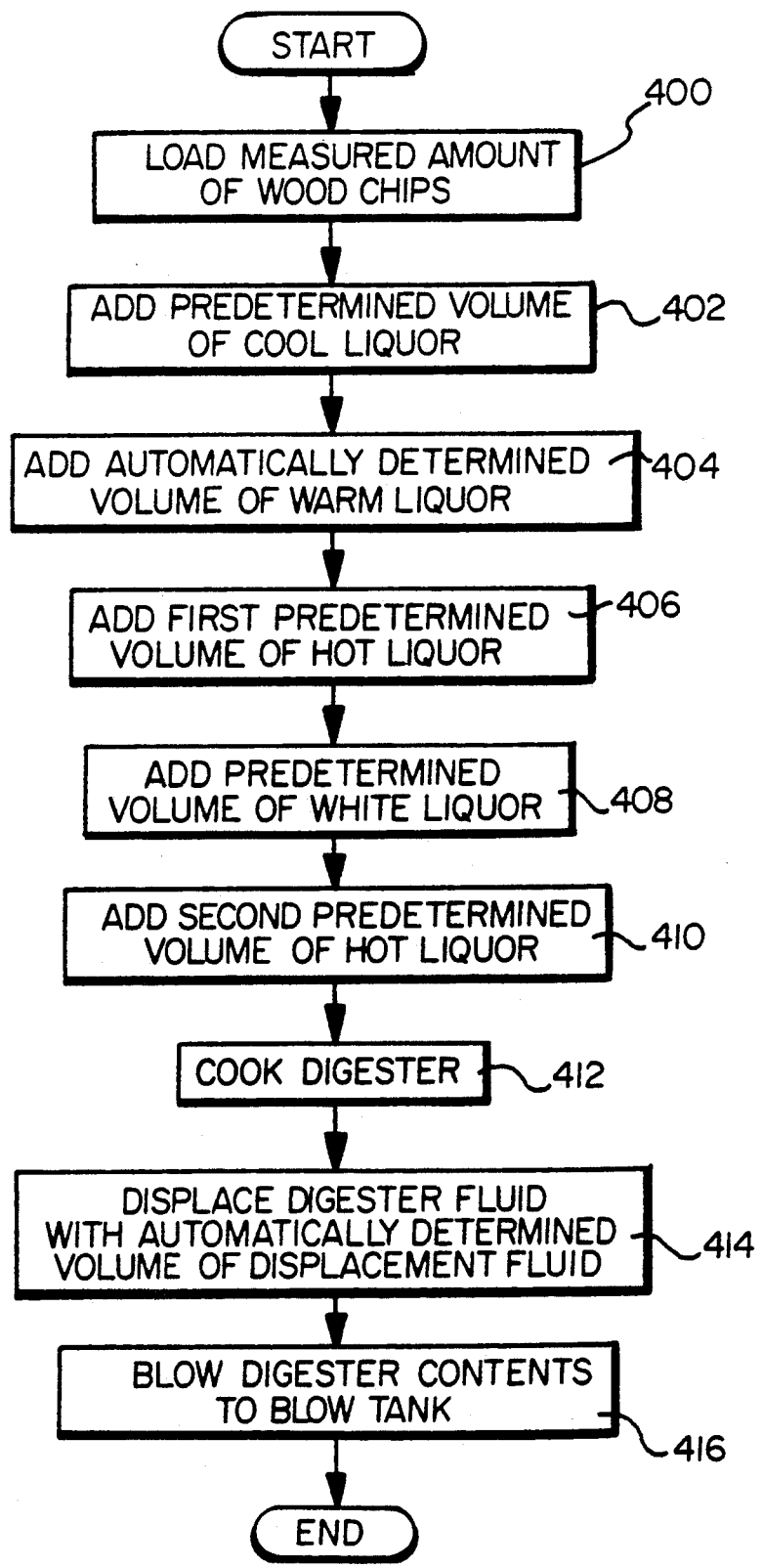
FIG. 3 is a flow chart of the operation of a digester.

A sharp level increase represented by the portion 446 is due to step 404 of FIG. 3 during which warm liquor is added to the digester. The cool liquor tank level increases during this step 404 because a portion of warm liquor that is added to the bottom of the digester is channeled from the top of the digester to the cool liquor tank 20. Because the volume of warm liquor that is added during the step 404 is automatically determined and may vary, the portions 446 are not necessarily the same size.

Figure 4B:
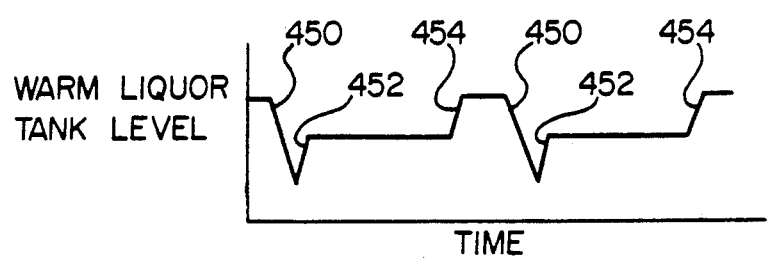

The fluid level within the warm liquor tank 22 varies with time according to FIG. 4b. A fluid level decrease represented by portions 450 occurs due to step 04 during which warm liquor is added to one of the digesters from the warm liquor tank. Since the amount of warm liquor is automatically determined and may vary, the size of the portions 450 may vary. The fluid level decrease represented by portion 450 occurs at the same time as the cool liquor tank fluid level changes represented by portions 442 and 444.

A fluid level increase represented by the portion 452 is due to steps 406-410 of FIG. 3 during which hot liquor and white liquor are added to the digester. The warm liquor tank level increases during the steps 406-410 because a portion of hot liquor that is added to the bottom of the digester is channeled from the top of the digester to the warm liquor tank 22. Because the volumes of hot and white liquor that are added during the steps 406-410 are predetermined, the portions 452 are the same size for each digester cycle.

A second fluid level increase represented by the portions 454 occurs during each cycle due to step 414 of FIG. 3. During step 414, the digester fluid contents are displaced to first the hot liquor tank 24 and then the warm liquor tank 22 by an automatically determined volume of displacement fluid.

Figure 4C:
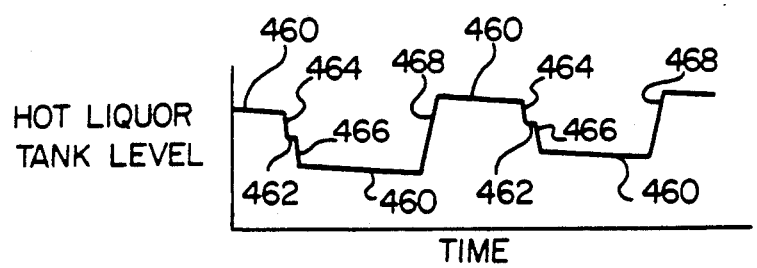

The fluid level within the hot liquor tank 24 varies with time according to FIG. 4c. The fluid level slowly decreases at all times as represented by portions 460, 462 due to fluid flow from the hot liquor tank 24 to the warm liquor tank 22 via the conduit 186 through the heat exchanger 184. This flow may be varied to adjust the fluid level within the hot liquor tank 24 and to vary the amount of preheating of the white liquor by the hot liquor via the heat exchanger 184.

A first fluid level decrease represented by portions 464 occurs due to step 406 of FIG. 3 during which a first predetermined volume of hot liquor is added to one of the digesters from the hot liquor tank 24. A second fluid level decrease represented by portions 466 occurs due to step 410 of FIG. 3 during which a second predetermined volume of hot liquor is added to the digester from the hot liquor tank 24. Since the two hot liquor volumes of steps 406, 410 are predetermined, the fluid level changes represented by portions 464, 466 are constant for each cycle.

A fluid level increase represented by the portions 468 occurs during each cycle due to step 414 of FIG. 3. During step 414, the digester fluid contents are displaced to first the hot liquor tank 24 and then the warm liquor tank 22 by an automatically determined volume of displacement fluid. The fluid level increase represented by the portions 468 occurs just prior to the warm liquor tank fluid level increases represented by the portions 454 of FIG. 4b.

Figure 4D:
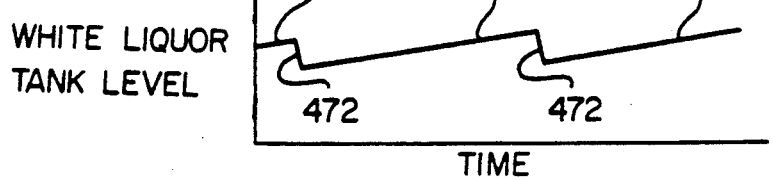

The fluid level within the white liquor tank 170 varies with time according to FIG. 4d. The fluid level represented by the portions 470 gradually increases due to a relatively steady fluid flow to the white liquor tank 170 via the conduit 180. A fluid level decrease represented by the portions 472 occurs during step 408 of FIG. 3 when a predetermined volume of white liquor is added to one of the digesters. Since the amount of white liquor is predetermined, the portions 472 are constant for each cycle. The white liquor level decreases represented by the portions 472 occur at the same times as the portions 462 of FIG. 4c.

Figure 4E:
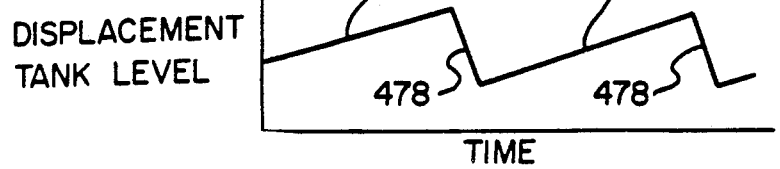

The fluid level within the displacement tank 210 varies with time according to FIG. 4e. The fluid level within the displacement tank 210 gradually increases at all times as illustrated by the portions 476 due to a relatively steady flow of fluid to the displacement tank 210 from the brown stock filtrate tank (not shown). The displacement fluid level sharply decreases once each cycle as represented by portion 478 due to step 414 of FIG. 3 during which an automatically determined volume of displacement fluid is transferred from the displacement tank 210 to one of the digesters. The displacement level decreases represented by the portions 478 occur at the same times as the portions 454 of FIG. 4b and 468 of FIG. 4c.

As described above, the operation of each of the digesters is staggered by the cycle time. If the operation of the processing system progressed exactly according to this staggered schedule without interruptions or disturbances, the control of the fluid levels within each of the tanks would be relatively simple. However, in the actual operation of the system, numerous disturbances might occur which would upset the schedule. Also, the supply of available filtrate supplied to the displacement tank may vary. As a result, either the lack of fluid or excess fluid within one of the tanks 20, 22, 24, 170, 210 may impair the efficient operation of the system, requiring the system operator to take some type of action.

Level Trend Routine 500

In the preferred embodiment of the present invention, the fluid levels within the tanks 20, 22, 24, 170, 210 are automatically controlled to reduce the likelihood of adverse effects of system disturbances. This automatic control of the fluid levels involves comparing the trend of the actual fluid level within each tank with the desired fluid level for that tank and taking control action based upon the difference. As can be seen from FIGS. 4a through 4e, the fluid levels within the tanks rapidly change based upon the particular operation being performed. In order to determine the trend of the actual fluid level within a tank, the processing system uses a relatively long fluid level averaging period. The averaging period is at least about equal to the cycle time, and preferably a multiple of the cycle time. As a result, the processing system effectively ignores relatively short term fluid level variations while being sensitive to long term fluid level variations.

Figure 5A:
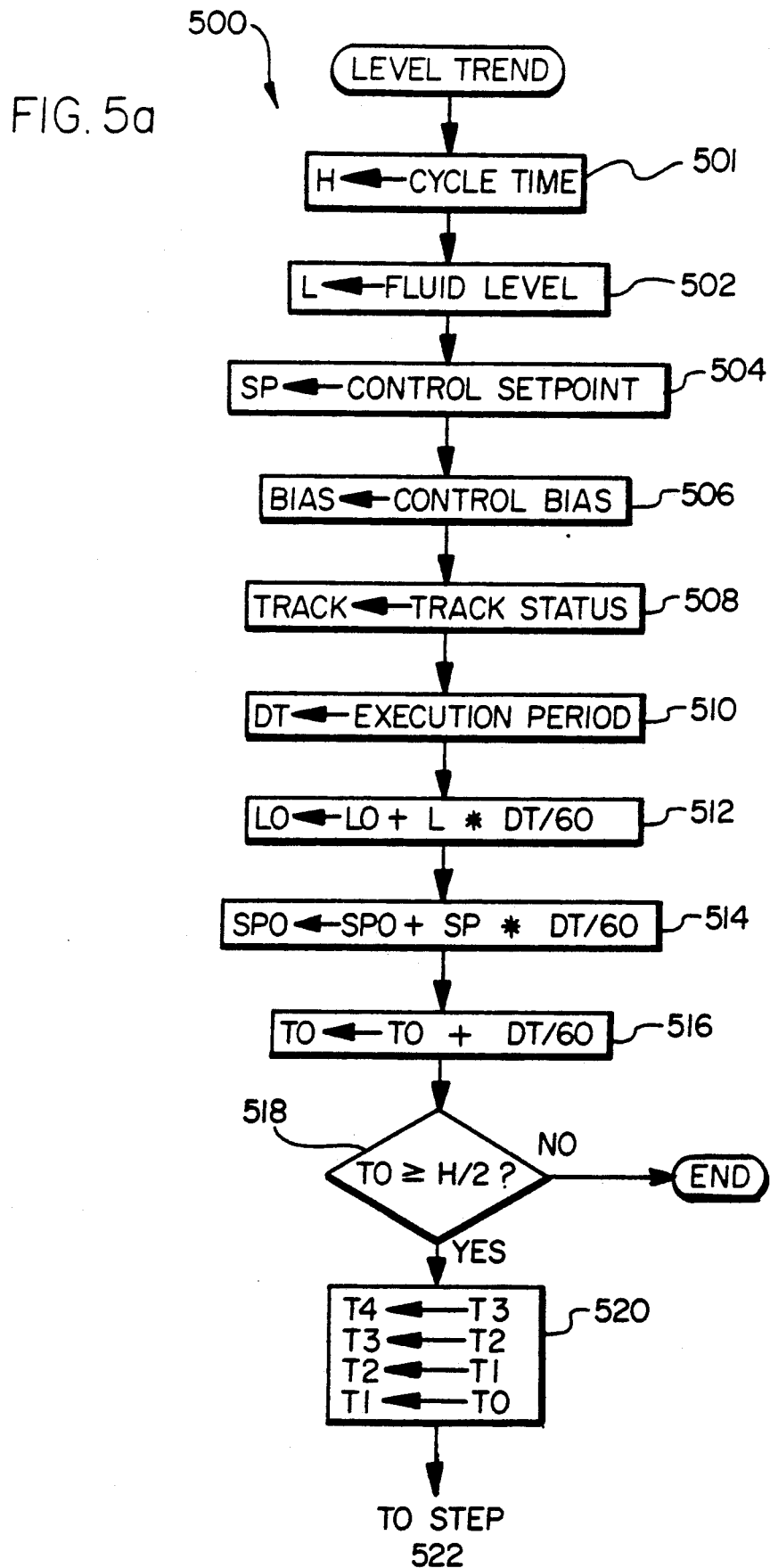
FIGS. 5a and 5b are flow charts of a level trend subroutine of the processing system.
Figure 5B:
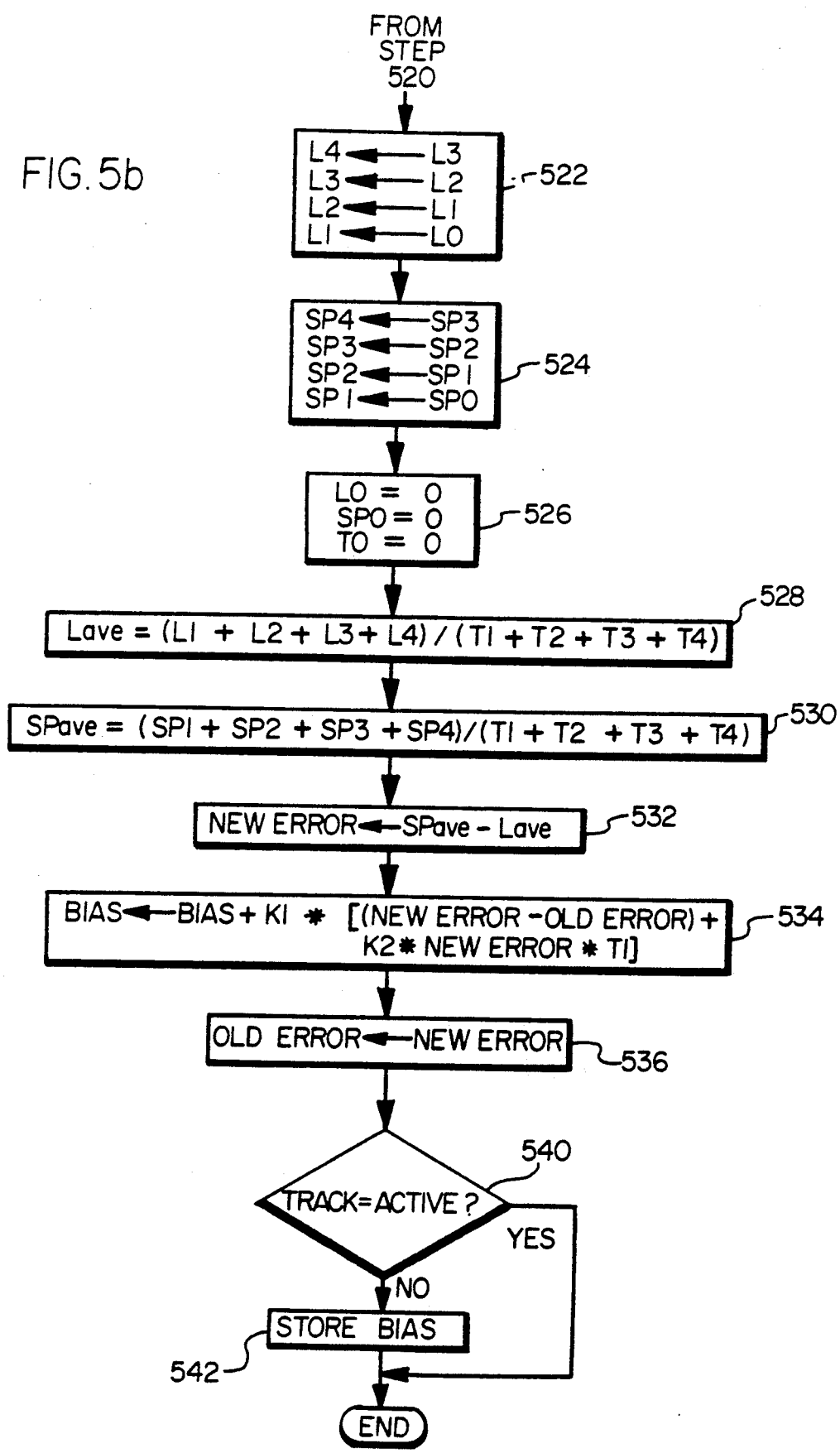

FIGS. 5a and 5b illustrate a flow chart of a level trend software subroutine 500 executed by the continuous controller 244 that tracks the trend of the levels within each of the tanks 20, 22, 24, 170, 210. In general, the subroutine 500 of FIG. 5 determines four average fluid levels, each of which is based on a sampling period equal to one-half of the cycle time. Each of these four average fluid levels is then averaged over a averaging period equal to two cycle times.

The subroutine 500 illustrated in FIGS. 5a and 5b is called by each of five separate software routines, one for each of the five tanks 20, 22, 24, 170, 210, as described below. Each time the subroutine 500 is invoked, the calling routine passes the current value of a number of variables to the subroutine 500, and upon completion of execution of the subroutine 500, new values are passed back to the calling routine.

Now referring to FIG. 5a, at step 501 the system cycle time defined above, in minutes, is stored in the variable H. During steps 502-510, the numeric value of a number of variables are passed from the calling routine to the subroutine 500. At step 502, the numeric value of the measured tank fluid level of the tank associated with the calling routine is stored in the variable L. For example, if the calling routine is the one that monitors the cool liquor tank fluid level, L would be the current fluid level in the cool liquor tank 20 as measured by the level transducer 65.

At step 504, the numeric value of the control setpoint for the calling routine is stored in the variable SP. The control setpoint is the desired target fluid level.

At step 506, the current value of the control bias for the calling routine is stored in the variable BIAS. As described in more detail below, the value of BIAS has an effect on the control of the fluid level within a tank.

At step 508, the tracking status is stored in the variable TRACK. The TRACK variable is used to prevent the level trend routine 500 from storing the variable BIAS at step 542 for various reasons. One of these reasons is the prevention of windup in the system. Windup occurs in cases where the actual value of the variable being controlled varies from the setpoint value and further control action cannot effectively reduce the differential between the actual value and the setpoint, or error. For example, windup would occur where there was a large error between the desired fluid level and the setpoint level, yet the valve for reducing that error was fully open. Since the valve is already fully open, nothing more can be done to reduce the error. In such a case, the value of the control bias is no longer adjusted. Windup is a well known concept in the process control art and various conventional measures are used to prevent windup.

At step 510, the execution period is stored in the variable DT. The execution period is the period of time, in seconds, between each call of the subroutine 500 by the calling routine. For example, if the subroutine 500 is called once a minute, DT would equal 60. The execution period is also equal to the amount of time between successive samples.

Steps 512-516 perform a rectangular integration of the fluid level, the control setpoint, and the sampling time for the tank associated with the calling routine. The variable L0 stores a running total of measured tank fluid levels. Each time step 512 is executed, the current measured tank level L is multiplied by the number of minutes since the last fluid level sampling, which is represented by DT/60 since DT is in seconds. This new fluid level, L * DT/60, is added to the previous fluid level total L0, and then the sum representing the new fluid level total is stored back in L0.

Step 514 is similar to step 512. In step 514, the variable SP0 stores a running total of tank fluid level setpoints. Each time step 514 is executed, the current tank level setpoint SP is multiplied by the number of minutes since the last setpoint check, which is represented by DT/60 since DT is in seconds. This new setpoint level, SP * DT/60, is added to the previous setpoint level total SP0, and then the sum representing the new setpoint level total is stored back in SP0.

Step 516 keeps track of the amount of time, T0, that has elapsed since the sampling period was started. Each time step 516 is executed, the time elapsed since the last sample, DT/60, is added to the previous elapsed sampling time, and the new elapsed sampling time is stored back in T0.

At step 518, the elapsed sampling time, T0, is compared with a desired, predetermined sampling period, H/2, corresponding to one-half the cycle time. If the elapsed sampling time has not yet reached the desired sampling period, the subroutine 500 ends, and the newly computed values L0, SP0, and T0 are passed to the calling routine.

If the elapsed sampling time is greater or equal to H/2, then the desired sampling period has been achieved, and the program branches to step 520. During steps 520-530, an actual tank fluid level is determined over an averaging period, 2H, equal to four sampling periods, H/2. At step 520, the newest sampling period, T0, is stored in the variable T1, and the previous three time periods, T1, T2, T3, respectively, are stored in the variables T2, T3, T4, respectively. As a result, T1, T2, T3, and T4 contain the elapsed times of the last four sampling periods. These actual times will be used to determine the average tank level as described below in connection with step 528.

At step 522, the newest fluid level total, L0, is stored in the variable L1, and the three previous fluid level totals, L1, L2, L3, respectively, are stored in the variables L2, L3, L4, respectively. As a result, L1, L2, L3, and L4 contain the fluid level totals of the last four sampling periods. These fluid level totals are used to determine the average tank level as described below in connection with step 528.

At step 524, the newest setpoint level total, SP0, is stored in the variable SP1, and the three previous setpoint totals, SP1, SP2, SP3, respectively, are stored in the variables SP2, SP3, SP4, respectively. As a result, SP1, SP2, SP3, and SP4 contain the setpoint level totals of the last four sampling periods. These setpoint level totals are used to determine the average tank level as described below in connection with step 528.

At step 526, the numeric values of the three variables L0, SP0, and T0, are reset to zero and sent to the calling routine since a new sampling period will begin the next time that the subroutine 500 is called by the calling routine.

Figure 6A:
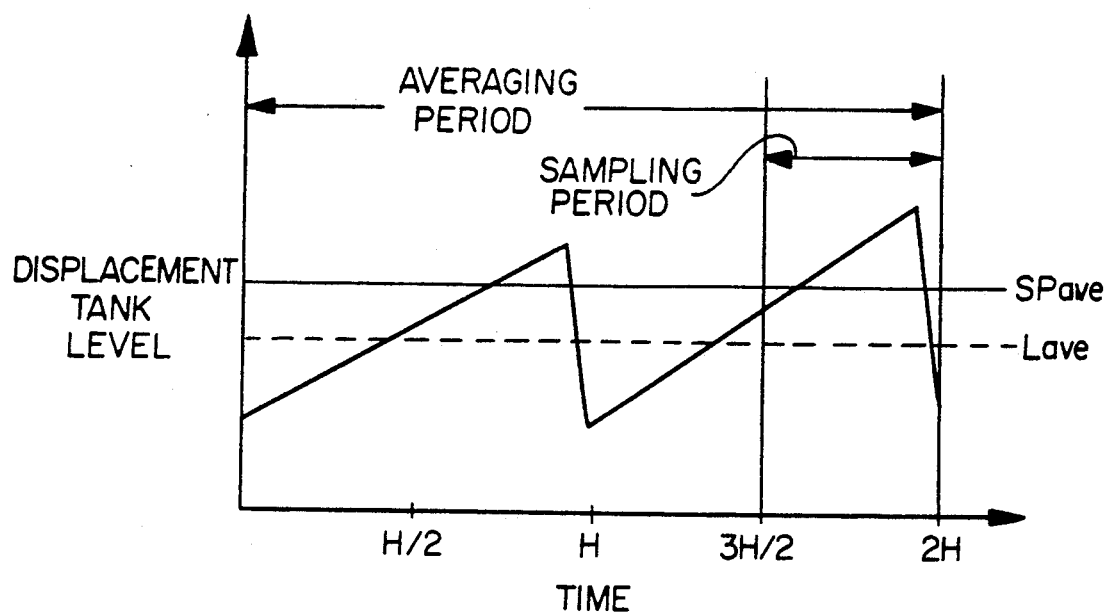
FIG. 6a illustrates the variance of the displacement tank fluid level with time.

The actual fluid level average, Lave, for the tank associated with the calling routine is determined at step 528 based on an averaging period of twice the cycle time, 2H. The average fluid level is determined by dividing the sum of the last four fluid level totals, L1+L2+L3+L4, by the averaging period, which is the sum of the last four sampling periods, T1+T2+T3+T4. Such a fluid level average Lave for the displacement tank is conceptually illustrated by the dotted line in FIG. 6a.

The setpoint level average, SPave, for the tank associated with the calling routine is determined at step 530 based on an averaging period of twice the cycle time, 2H. The average setpoint level is determined by dividing the sum of the last four setpoint level totals, SP1+SP2+SP3+SP4, by the averaging period, which is the sum of the last four sampling periods, T1+T2+T3+T4. Such a setpoint level average SPave for the displacement tank is conceptually illustrated by the solid horizontal line in FIG. 6a.

At step 532, the actual fluid level average, Lave, is subtracted from the setpoint average, SPave, and the result is stored in the variable NEW ERROR. The numeric value of NEW ERROR is thus related to the amount by which the actual fluid level of a tank varies from the desired level.

A control bias factor which is used in the control of the actual tank level of its associated tank is determined at step 534. The initial bias factor, BIAS, was transmitted by the calling routine during step 506 of FIG. 5a described above. In step 534, an adjustment factor, K1 * [(NEW ERROR−OLD ERROR)+K2 * NEW ERROR * T1], is added to the numeric value of the initial bias factor, BIAS. K1 and K2 are constants that may be assigned values depending upon the desired contribution of the factors that they multiply.

This adjustment factor has several components. An important component is the difference (NEW ERROR−−OLD ERROR). This component contributes to the level control based upon the trend of the fluid level, i.e. whether the difference between the actual average fluid level and the average setpoint level is getting larger or smaller.

Figure 6B:
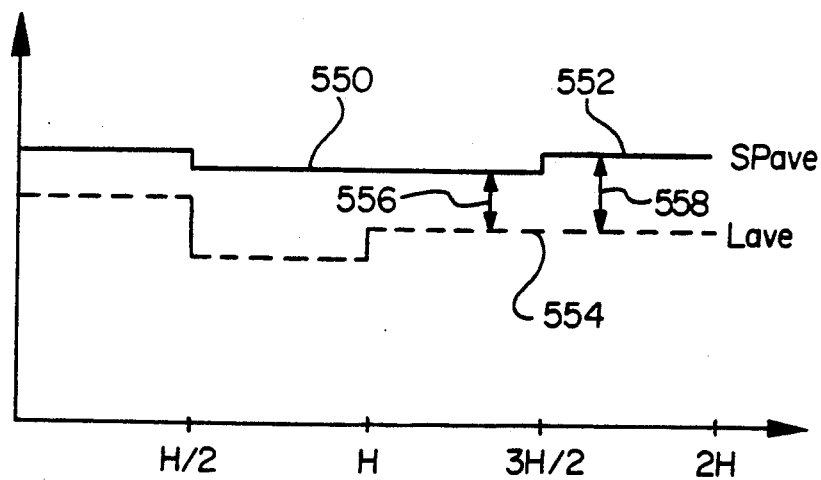
FIG. 6b illustrates the variance of a target fluid level average, SPave, and actual fluid level average, Lave, with time.

Now referring to FIG. 6b, a graph of SPave versus Lave for four sampling periods H/2 is shown. Since SPave is determined at the end of each sampling period H/2, SPave can vary accordingly, and is shown to include two segments 550, 552. Lave, which is also computed at the end of each sampling period, includes a segment 554. At the completion of step 532 during the last sampling period, i.e. the time period between 3H/2 and 2H, the value of NEW ERROR would correspond to the difference between the segments 552 and 554 as represented by the arrow 558, and OLD ERROR, which is the error for the previous sampling period, would correspond to the difference between the two segments 550 and 554 as represented by the arrow 556. Thus, the numeric difference (NEW ERROR−OLD ERROR) would conceptually correspond to the difference in lengths between the segments 556, 558.

Referring back to FIG. 5b, after the new value of BIAS is determined, at step 536 the numeric value of NEW ERROR is transferred to OLD ERROR. At step 540, if the value of TRACK is active, then the newly determined value of BIAS is not used, and in that case the subroutine ends. If TRACK is not active, the newly computed value of BIAS is stored at step 542 for use as a remote setpoint as described in more detail below.

Level Control Routines 570

Figure 7:
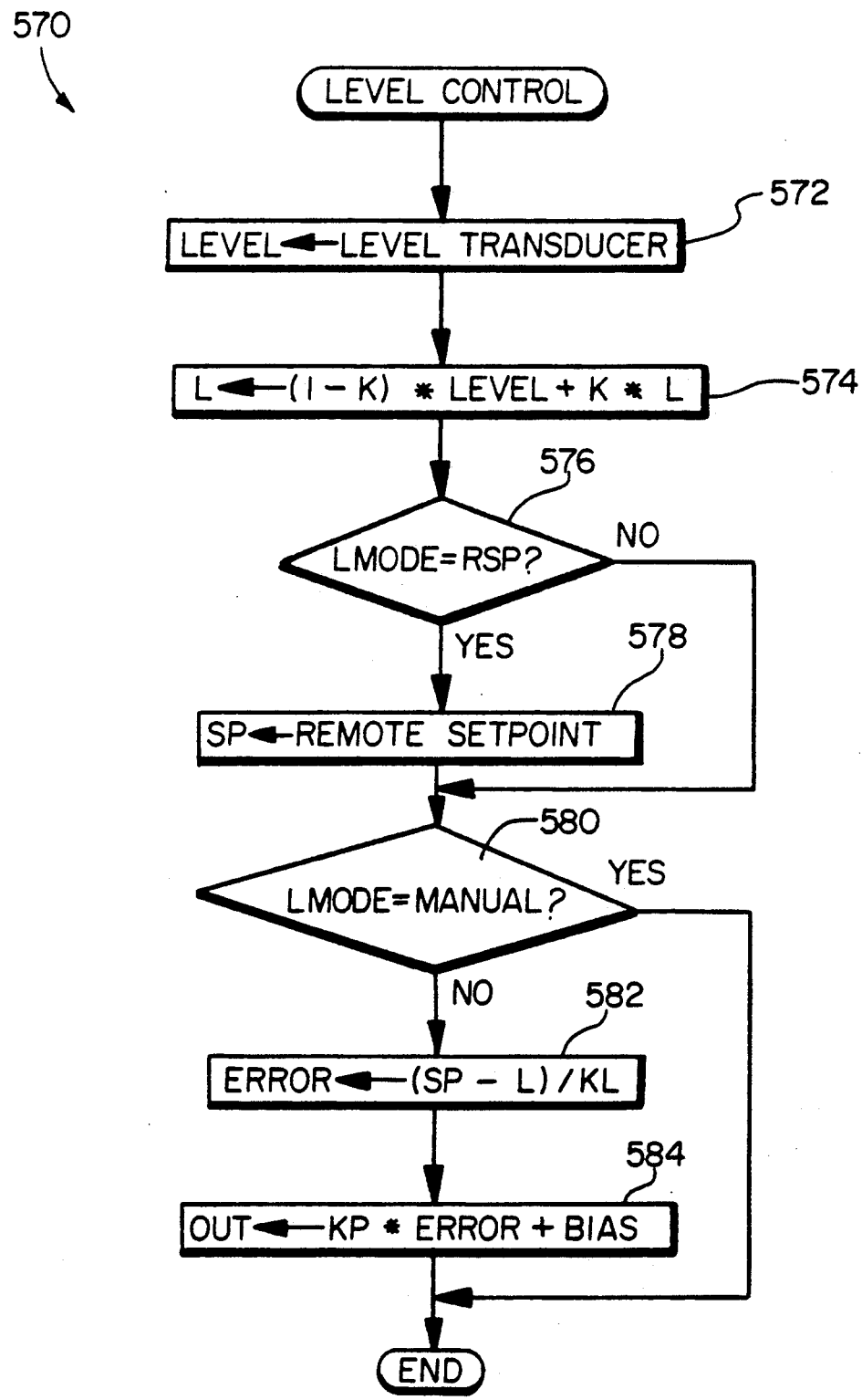
FIG. 7 is a flow chart of a level control routine of the processing system.

For purposes of controlling the fluid levels within each of the five tanks 20, 22, 24, 170, 210, a separate level control routine 570 is associated with each tank. Since the operation of each of these level control routines 570 is identical, only one of these level control routines 570 is shown and described. Each of these five level control routines 570 is resident in and executed by the continuous controller 244. Now referring to FIG. 7, a flowchart of the level control routine 570 is shown. This level control routine 570 is repeatedly executed, once per second for example, to generate a control signal, OUT, based upon the control bias and the difference between the actual measured fluid level within a tank and the desired target level, or setpoint, within the tank. The level control routines 570 utilize proportional plus bias control, which is a conventional type of control.

Upon initiation of the level control routine 570, the fluid level within the associated tank is read by the level transducer associated with the tank, and a numeric value corresponding to the fluid level is stored in the variable LEVEL. At step 574 a conventional filtering operation takes place. The purpose of the filtering operation is to filter out relatively high frequency fluctuations in the measured fluid level, LEVEL. To this end, the variable L stores the previous fluid level value determined during the previous execution of step 574. The new value of L determined at step 574 is computed by adding the product of a constant K and the previous value L to the product of (1−K) and the newly measured value LEVEL, where K is a constant between 0 and 1. If a relatively small amount of filtering is desired, the value of K is chosen to be small so that the major contribution to the new value of L is generally equal to the LEVEL value just measured. For a large amount of filtering, the constant K is chosen to be large so that LEVEL contributes only a minor portion to the new value of L.

At step 576, the mode of the level control routine is tested. The level control routine may be operated in one of three modes. If the mode is manual, the output of the level control routine is simply determined by the operator manually via the console of the processing system. In the manual mode, the level control routine does not have any effect on the fluid level since the operator is responsible for manually controlling the fluid level. In the automatic mode, the level control routine generates a signal, OUT, the value of which depends upon the bias and the difference between the fluid level L and a predetermined fluid level setpoint selected by the operator. Thus, in the automatic mode the processing system will automatically control the tank fluid level without the need for frequent intervention by the operator. A third mode, the remote setpoint or RSP mode, is similar to the automatic mode except that the level control routine uses a setpoint that may be automatically varied by another portion of the system software. Thus, there is no need for the operator to periodically check and/or change the setpoint since that is done automatically by the system.

If the level control mode, LMODE, is the RSP mode, then the program branches to step 578 at which point the automatically determined setpoint is retrieved from its remote location and stored in the variable SP. If LMODE was the RSP mode as determined at step 576, then the program skips the step 578 since no remote setpoint needs to be retrieved. In this case, the level setpoint selected by the operator is used for the variable SP.

At step 580, the program determines whether the LMODE is manual. If it is, meaning that there will be no automatic control utilized, then the routine 570 simply ends without taking further action. If the LMODE is not manual, then the routine branches to step 582 where a variable ERROR is determined by subtracting the level value L from the setpoint value SP and dividing the difference by a scaling factor KL. The scaling factor equals the full scale range of the level transducer divided by 100 so that the value of ERROR corresponds to percent of full scale range. For example, if the full scale level transducer range is 0–40 fluid level units, the value of KL would equal 40/100, or 0.4. In this case, if the setpoint were 30 units and the measured level L were 20 units, the value of ERROR would be (30-20)/0.4, or 25% of the full scale range of 40 units.

At step 584, the value of ERROR is multiplied by a predetermined constant KP and added to the value of BIAS to determine the value of the control signal OUT. As explained above, BIAS is determined by the level trend routine 500. The constant KP may be varied, depending upon the desired contribution of ERROR to the control signal OUT.

It should be noted that the level control routine does not itself cause any valves to change position, but merely generates the control signal OUT, which is used by a respective flow control routine described below. It is the associated flow control routine that actually controls the valves which cause the tank levels to be controlled.

Flow Control Routines 590

The fluid levels in the four tanks 20, 22, 24, 170 are automatically controlled by adjusting the positions of the valves 204, 194, 188, and 182, respectively. The valve positions of these four valves are controlled by four flow control routines, one associated with each of the four valves 204, 194, 188, 182. Each flow control routine has an associated level control routine, as described above, that generates the control signal OUT for use by the flow control routine. Each of the flow control routines 590 is resident in and executed by the continuous controller 244.

The fluid level of the displacement tank 210 is not controlled by adjusting the position of an associated valve; it is controlled by automatically varying the quantity of displacement fluid transmitted to the digester in step 414 described above. Thus, the displacement tank 210 does not utilize a flow control routine.

Figure 8:
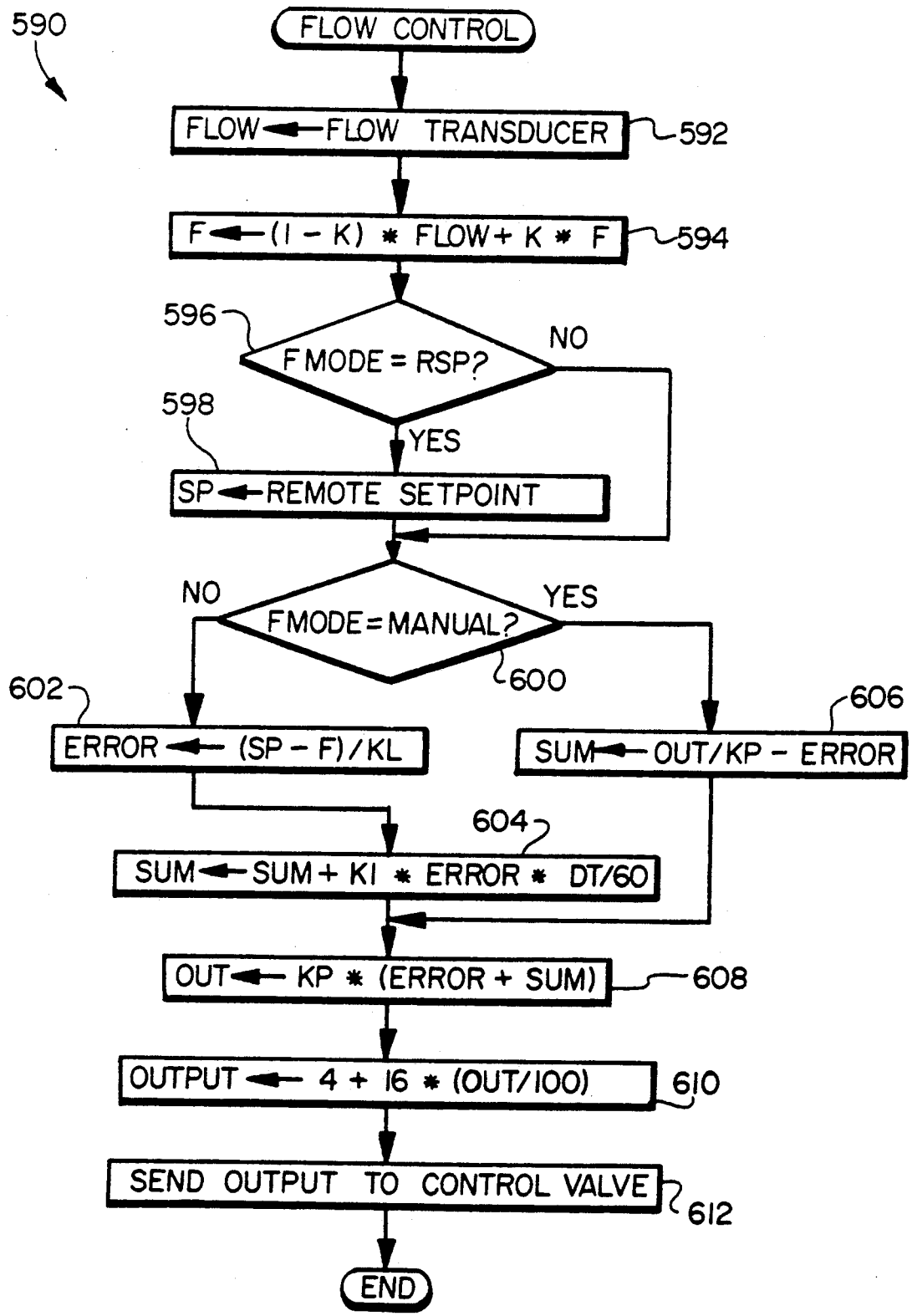
FIG. 8 is a flow chart of a flow control routine of the processing system.

The operation of the four flow control routines is identical, and one of these flow control routines is shown and described in FIG. 8. Now referring to FIG. 8, a flow chart of a flow control routine 590 is shown. This flow control routine 590 is repeatedly executed, once per second for example, to generate a control signal, OUTPUT, based upon the difference between the actual measured fluid flow through the associated valve and the desired target flow, or setpoint, through the valve. Flow control routine 590 utilizes proportional plus reset (PI) control, which is a conventional type of control.

Upon initiation of the flow control routine 590, at step 592, the fluid flow through the associated valve is read by the flow transducer associated with that valve, and a numeric value corresponding to the fluid flow is stored in the variable FLOW. At step 594 a filtering operation takes place in the same manner as described above in connection with step 574. The variable F stores the fluid flow value determined during the previous execution of step 594. The new value of F determined at step 594 is computed by adding the product of a constant K and the previous value F to the product of (1−K) and the newly measured value FLOW, where K is a constant between 0 and 1.

At step 596, the mode of the flow control routine is tested. The flow control routine may be operated in one of the three modes described above: manual, automatic, or remote setpoint. Each mode of operation is the same as described above in connection with the level control routine, except that fluid flow rates are used instead of fluid levels.

If the flow control mode, FMODE, is the RSP mode, then the program branches to step 598 at which point the automatically determined setpoint is retrieved from its remote location and stored in the variable SP. In the preferred embodiment, this remote setpoint is determined based upon the variable OUT that was determined at step 584 by the level control routine 570 associated with the flow control routine. If FMODE was not the RSP mode as determined at step 596, then the program skips the step 598 since no remote setpoint needs to be retrieved. In this case, the flow setpoint selected by the operator is used in the variable SP.

At step 600, the program determines whether the FMODE is manual. If it is, meaning that there will be no automatic control utilized, then the routine 590 branches to step 606 where a control signal SUM is determined without taking into account the variance of the measured flow from the desired flow setpoint. The value of SUM is determined by subtracting the value of ERROR from the value of OUT divided by a constant KP to facilitate bumpless transfer in cases where the control switches from manual mode to automatic.

If the FMODE is not manual, then the routine branches to step 602 where the value of ERROR is determined based upon the difference between the flow and the flow setpoint. Specifically, ERROR is determined by subtracting the flow value F from the setpoint value SP and dividing the difference by a scaling factor KL. The setpoint value SP is the value of OUT that was determined by the associated level control routine and retrieved during the step 598. The scaling factor KL equals the full scale range of the flow transducer divided by 100 so that the value of ERROR corresponds to percent of full scale range.

At step 604, ERROR is multiplied by the reset gain, KI, and the rectangular integration factor DT/60. The product, KI * ERROR * DT/60, is then added to the previous value of SUM and stored in the current value of SUM. At step 608, SUM is added to ERROR, and then the result is multiplied by the proportional gain KP to produce the control signal OUT.

At step 610, the control signal OUTPUT is determined by scaling the output signal OUT by a number of factors, depending upon the valve actuator used. In the actual embodiment, the valve actuators are responsive to 4 to 20 milliampere current signals. Thus, in order to convert a percent open (or closed) position to the corresponding current value, the valve position OUT is divided by 100, and then the result is multiplied by 16. The number 4 is then added to the product. As an example, if the value of OUT is 50, corresponding to a desired valve position of 50% open, then OUTPUT will equal 4+16* (50/100), or 12 milliamps, which is midway in the 4–20 milliampere range of the valve actuator. At step 612, the control signal OUTPUT is sent to the valve actuator to cause the valve to move to the desired position.

Cool Liquor Tank Control Routine 620

The operation of the level trend routine 500, the level control routine 570, and the flow control routine 590 described above is coordinated by a separate software routine for each of the tanks 20, 22, 24, 170, 210. These five tank routines 20, 22, 24, 170, 210 are resident in and executed by the continuous controller 244. In the following description of these five tank software routines 620, 720, 800, 920, 1020, the terms "level control routine 570" and "flow control routine 590" refer to the routine associated with the tank being described. For example, in the description of the cool liquor tank routine 620, the term level control routine 570 means the particular level control routine 570 associated with the cool liquor tank 20.

A flowchart of a software routine 620 associated with the cool liquor tank 20 is shown in FIGS. 9a and 9b. The basic functions of the cool tank routine 620 include calling the level trend routine 500 and passing information from the level control routine 570 to the flow control routine 590.

Referring to FIG. 9a, at step 622 the mode of operation of the flow control routine 590 is read and stored in the FMODE variable. As described above, the mode can be manual, automatic, or remote setpoint. At step 624, the value of FMODE is tested to determine whether the flow control routine mode is remote setpoint. If it is not, meaning that the flow control routine will not use a remote setpoint generated by the level control routine 570, then the mode of operation of the level control routine 570 during the previous execution of the cool tank routine 620, OLD LMODE, is set to manual since the level control routine 570 does not need to automatically generate a setpoint for use by the flow control routine 590. The program then branches to step 632.

If at step 624 the flow control mode FMODE was remote setpoint, meaning that the flow control routine 590 will use the remote setpoint automatically generated by the level control routine 570, then the program branches to step 628 where the current mode, FMODE, is compared to the previous mode, OLD FMODE, to determine whether the operator has changed the flow control mode since the previous execution of the cool tank routine 620. If the mode has not been changed, then the program branches to step 632. If the mode has been changed, then the program branches to step 630 at which point the mode of the level control routine 570, LMODE, is changed to automatic so that the level control routine 570 will automatically determine the remote setpoint to be used by the flow control routine 590. The program then branches to step 632 where the current flow control mode, FMODE, is stored in the OLD FMODE variable.

At step 634, the current mode of the level control routine 570 is read and stored in LMODE. At step 636, the level control mode LMODE is tested to determine if it is manual. If LMODE is manual, meaning that the level control routine is not to automatically generate a control signal, then the program branches to step 638 where LMODE is compared to OLD LMODE to determine whether the level control routine 570 mode has been changed by the operator since the previous execution of the cool tank routine 620. If the level control mode has not been changed, then the program branches to step 642, at which point the TRACK variable is set to active, meaning that the BIAS variable determined by the level trend routine 500 will not be stored for use as a remote setpoint by the level control routine 570. If the mode has been changed, then the program branches to step 640 at which point the mode of the flow control routine, FMODE, is changed to automatic since no remote setpoint will be used by the flow control routine 590. The program then branches to step 642.

If the mode of the level control routine 570 is not manual as determined at step 636, then the program branches to step 644. Steps 644–654 determine whether the value of BIAS determined by the level trend routine 500 should be ignored to prevent windup in the system. At step 644, the output of the level control routine 570, OUT, is stored in the Lout variable. At step 646, the output of the flow control routine 590, OUT, is stored in the Fout variable. At steps 648 and 650, the value of Lout is tested to determine whether it is within the range of 0 to 100%. If it is not within this range, then the valve associated with the flow control routine 590 is already either fully open or fully closed, and cannot be moved further in the respective open or closed position, and the program branches to step 642 where TRACK is set to active.

At steps 652, 654, the value of Fout is tested to determine whether it is in the 0 to 100% range. If it is not within that range, then the program branches to step 642 at which point TRACK is set to active. At step 656 the status of the level trend routine is read and stored in the variable STAT. At step 658 the value of STAT is tested to determine whether the level trend routine has been disabled by the operator. If it has been disabled, then the program branches to step 642 where TRACK is set to active.

Step 660 is performed if none of the conditions tested in steps 636, 648, 650, 652, 654, and 658 are present. In this case, TRACK is set to inactive since the BIAS variable determined by the level trend routine is to be used. At step 662, the current mode LMODE of the level control routine 570 is stored in the OLD LMODE variable.

At step 664, the level trend subroutine 500 is called by the cool tank routine 620. The level trend subroutine is executed as described above, and calculates the value of BIAS used as a remote setpoint by the level control routine 570.

At step 666, the output, OUT, of the level control routine 570 is read and stored in the variable OUT in the cool tank routine 620. It should be noted that the cool tank routine 620 and the level control routine 570 run independently, and that there is no need to synchronize or otherwise coordinate the execution of those two routines. All that is necessary is that the cool tank routine 620 periodically read the output OUT of the level control routine 570.

At step 668 the value stored in OUT is written to the remote setpoint of the flow control routine 590 and the cool tank routine 620 ends. The cool tank routine 620 and the flow control routine 590 also run independently without the need for synchronization. All that is necessary is that the cool tank routine 620 periodically write the output OUT to the remote setpoint of the flow control routine 590.

Warm Liquor Tank Control Routine 720

Figure 10A:
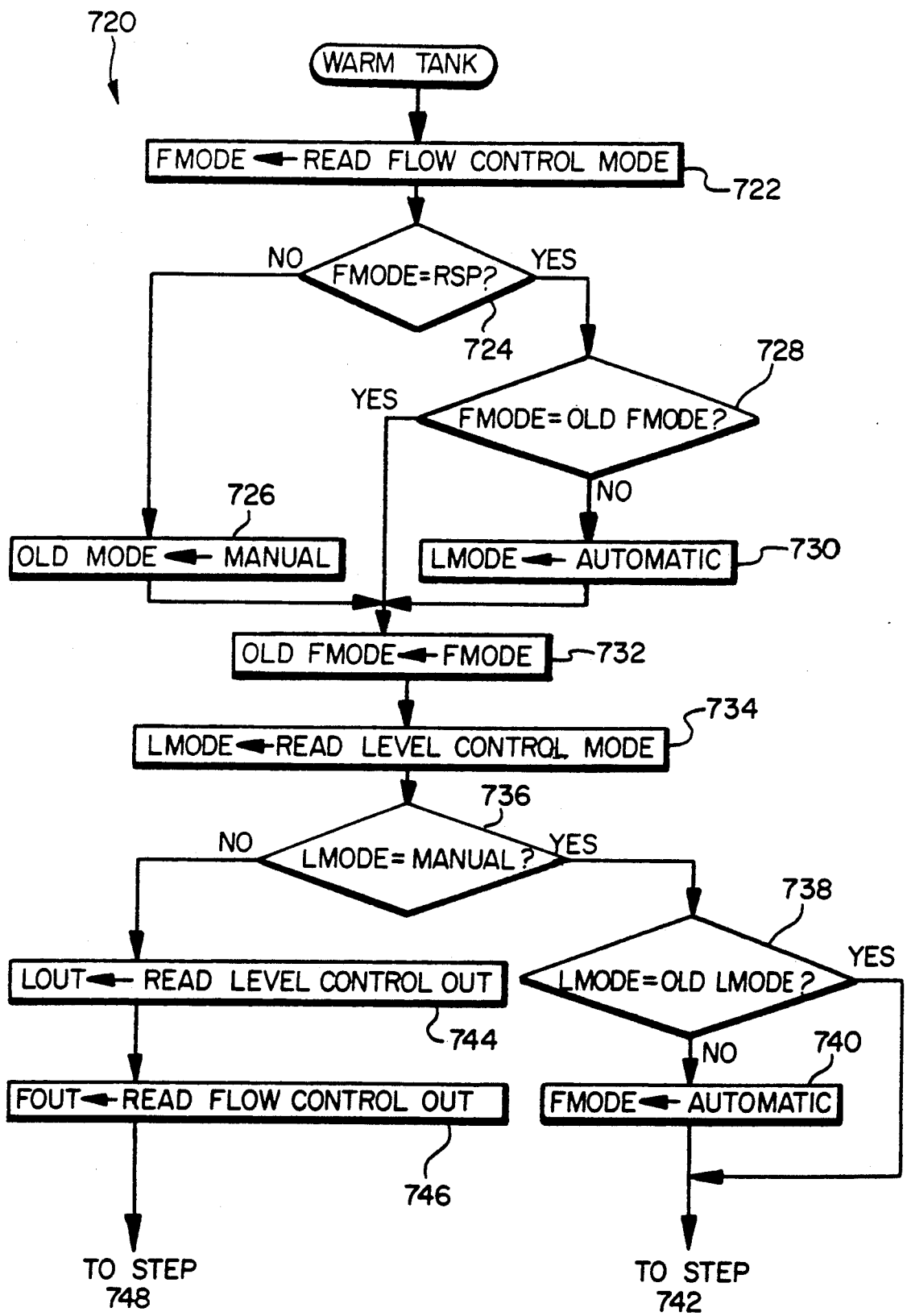

A flowchart of a software routine 720 associated with the warm liquor tank 22 is shown in FIGS. 10a and 10b. The basic functions of the warm tank routine 720 include calling the level trend routine 500 and passing information from the level control routine 570 to the flow control routine 590. The operation of the warm tank software routine 720 is substantially identical to that of the cool tank routine 620 described above.

Referring to FIG. 10a, at step 722 the mode of operation of the flow control routine 590 is read and stored in the FMODE variable. As described above, the mode can be manual, automatic, or remote setpoint. At step 724, the value of FMODE is tested to determine whether the flow control routine mode is remote setpoint. If it is not, meaning that the flow control routine will not use a remote setpoint generated by the level control routine 570, then the mode of operation of the level control routine 570 during the previous execution of the cool tank routine 720, OLD LMODE, is set to manual since the level control routine 570 does not need to automatically generate a setpoint for use by the flow control routine 590. The program then branches to step 732.

If at step 724 the flow control mode FMODE was remote setpoint, meaning that the flow control routine 590 will use the remote setpoint automatically generated by the level control routine 570, then the program branches to step 728 where the current mode, FMODE, is compared to the previous mode, OLD FMODE, to determine whether the operator has changed the flow control mode since the previous execution of the warm tank routine 720. If the mode has not changed, then the program branches to step 732. If the mode has changed, then the program branches to step 730 at which point the mode of the level control routine 570, LMODE, is changed to automatic so that the level control routine 570 will automatically determine the remote setpoint to be used by the flow control routine 590. The program then branches to step 732 where the current flow control mode, FMODE, is stored in the OLD FMODE variable.

At step 734, the current mode of the level control routine 570 is read and stored in LMODE. At step 736, the level control mode LMODE is tested to determine if it is manual. If LMODE is manual, meaning that the level control routine 570 is not to automatically generate a control signal, then the program branches to step 738 where LMODE is compared to OLD LMODE to determine whether the level control routine 570 mode has been changed by the operator since the previous execution of the warm tank routine 720. If the level control mode has not been changed, then the program branches to step 742, at which point the TRACK variable is set to active, meaning that the BIAS variable determined by the level trend routine 500 will not be stored for use as a remote setpoint by the level control routine 570. If the mode has been changed, then the program branches to step 740 at which point the mode of the flow control routine, FMODE, is changed to automatic since no remote setpoint will be used by the flow control routine 590. The program then branches to step 742.

If the mode of the level control routine 570 is not manual as determined at step 736, then the program branches to step 744. Steps 744–754 determine whether the value of BIAS determined by the level trend routine 500 should be ignored to prevent windup in the system. At step 744, the output of the level control routine 570, OUT, is stored in the Lout variable. At step 746, the output of the flow control routine 590, OUT, is stored in the Fout variable. At steps 748 and 750, the value of Lout is tested to determine whether it is within the range of 0 to 100%. If it is not within this range, then the valve associated with the flow control routine 590 is already either fully open or fully closed, and cannot be moved further in the respective open or closed position, and the program branches to step 742 where TRACK is set to active.

At steps 752, 754, the value of Fout is tested to determine whether it is in the 0 to 100% range. If it is not within that range, then the program branches to step 742 at which point TRACK is set to active. At step 756 the status of the level trend routine 500 is read and stored in the variable STAT. At step 758 the value of STAT is tested to determine whether the level trend routine 500 has been disabled by the operator. If it has been disabled, then the program branches to step 742 where TRACK is set to active.

Step 760 is performed if none of the conditions tested in steps 736, 748, 750, 752, 754, and 758 are present. In this case, TRACK is set to inactive since the BIAS variable determined by the level trend routine is to be used. At step 762, the current mode LMODE of the level control routine 570 is stored in the OLD LMODE variable.

At step 764, the level trend subroutine 500 is called by the warm tank routine 720. The level trend subroutine 500 is executed as described above, and calculates the value of BIAS used as a remote setpoint by the level control routine 570.

At step 766, the output, OUT, of the level control routine 570 is read and stored in the variable OUT in the warm tank routine 720. The warm tank routine 720 and the level control routine 570 run independently, with the warm tank routine 720 periodically reading the output OUT of the level control routine 570.

At step 768 the value stored in OUT is written to the remote setpoint of the flow control routine 590 and the warm tank routine 720 ends. The warm tank routine 720 and the flow control routine 590 also run independently without the need for synchronization. The warm tank routine 720 just periodically writes the output OUT to the remote setpoint of the flow control routine 590.

Hot Liquor Tank Control Routine 800

Figure 11A:
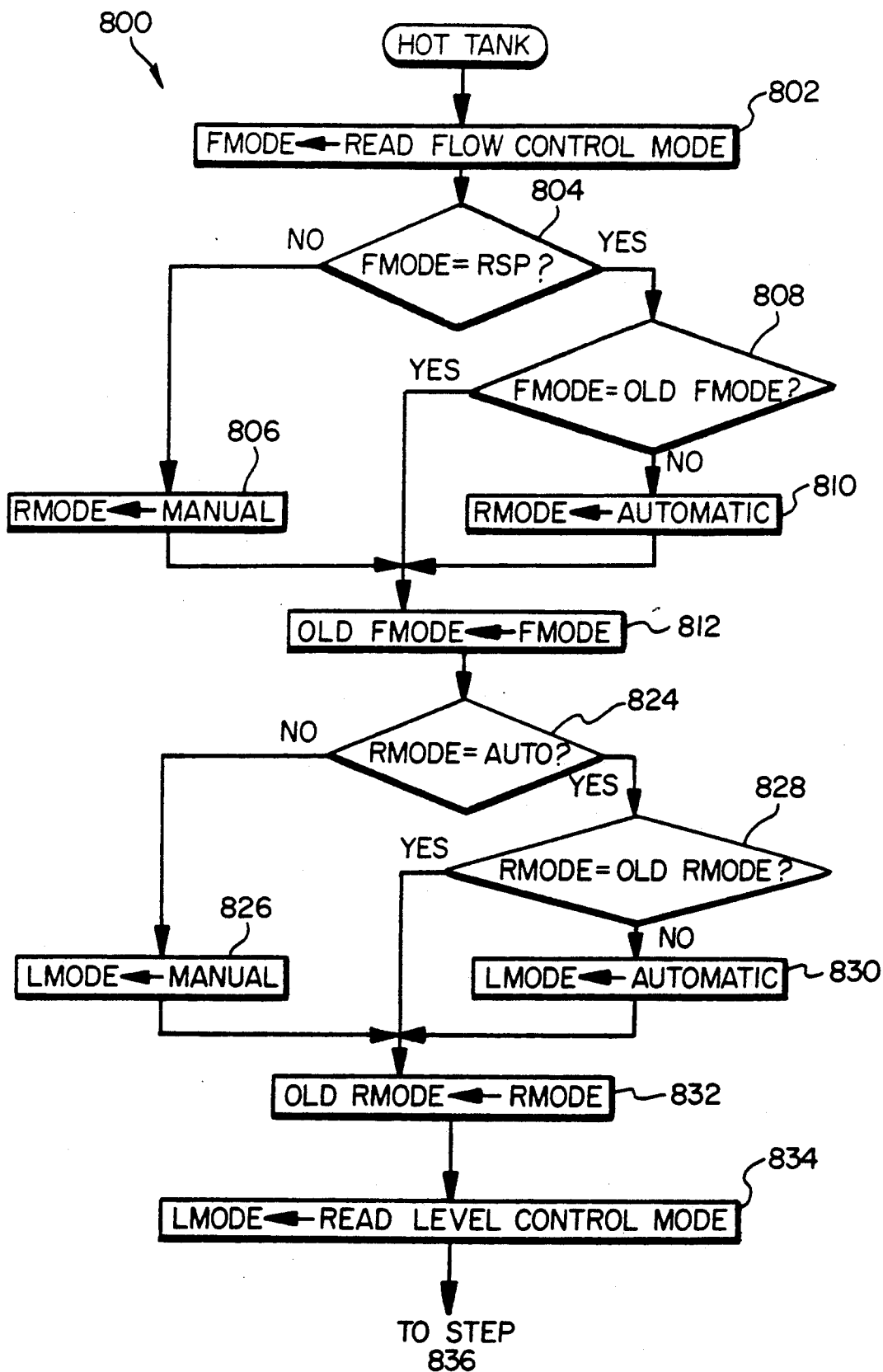
FIGS. 11a through 11c are flow charts of a hot liquor tank control routine of the processing system.
Figure 11B:
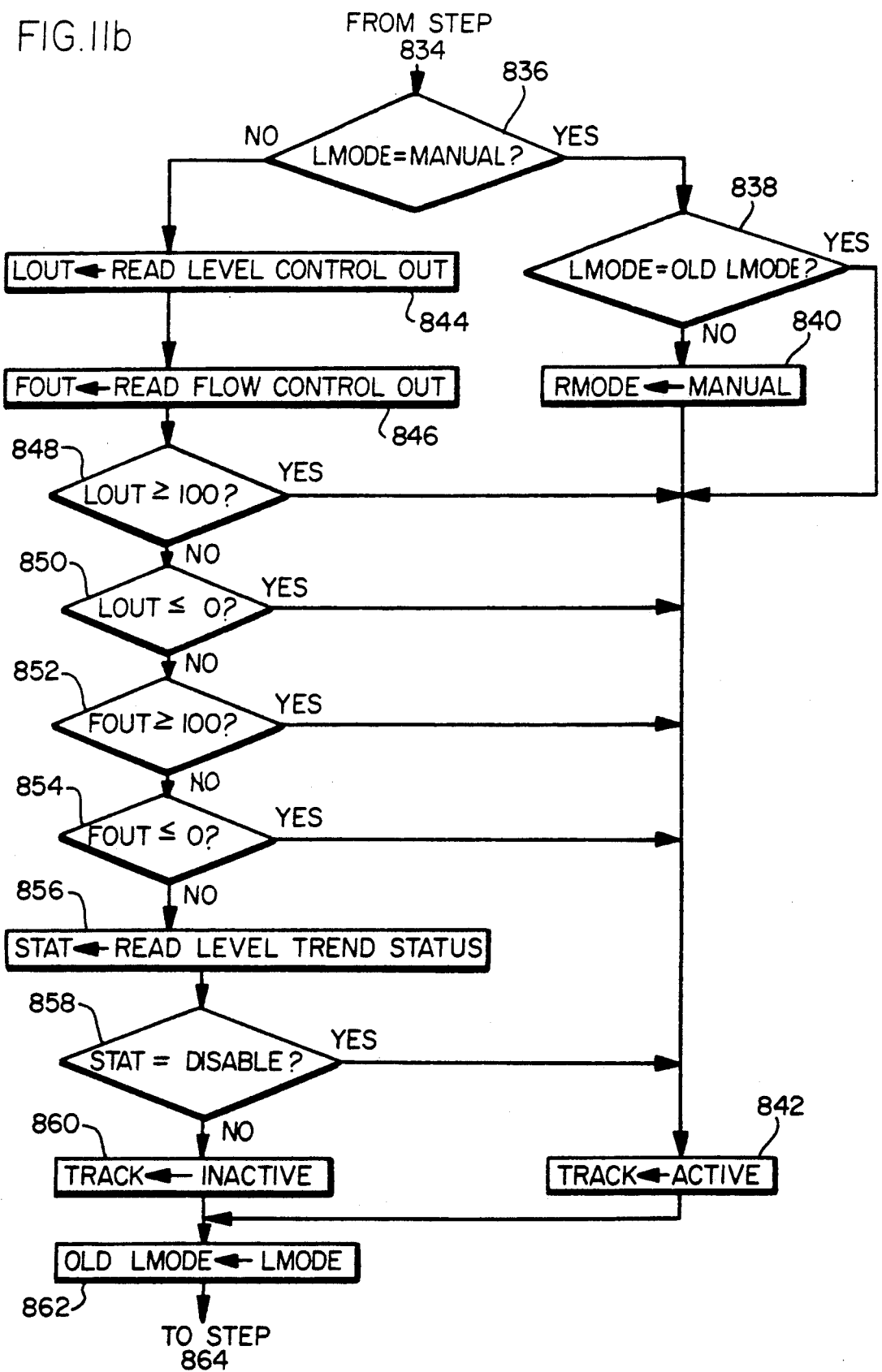
Figure 11C:
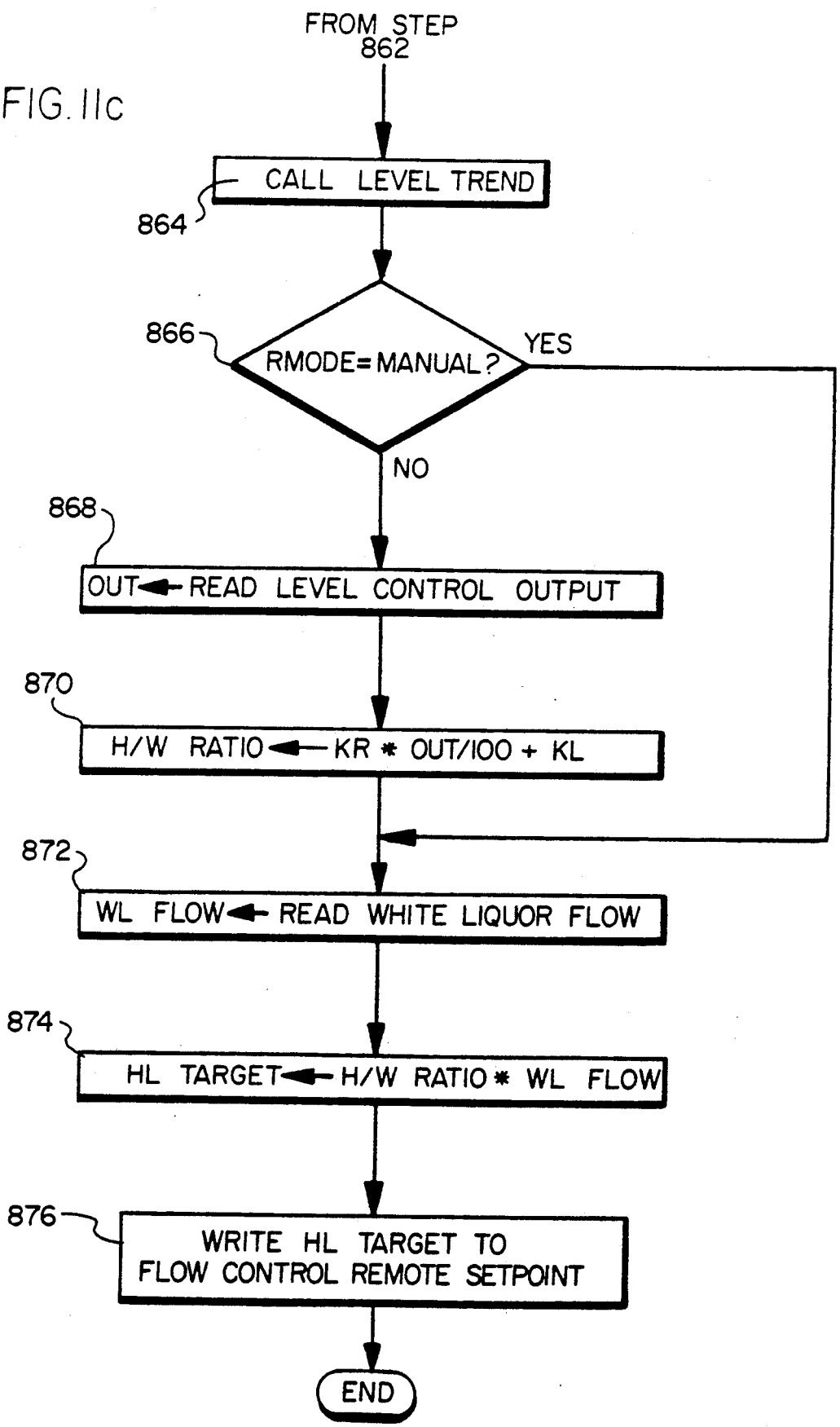

A flow chart of a control routine 800 associated with the hot liquor tank 24 is shown in FIGS. 11a through 11c. The basic functions of the hot tank routine 800 include calling the level trend routine 500 and passing information from the level control routine 570 to the flow control routine 590.

Referring to Fig. 11a, at step 802 the mode of operation of the flow control routine 590 is read and stored in the FMODE variable. At step 804, the value of FMODE is tested to determine whether the flow control routine mode is remote setpoint. If it is not, meaning that the flow control routine will not use a remote setpoint generated by the level control routine 570, the program branches to step 806 at which the variable RMODE is set to manual. When RMODE is automatic, the ratio of the flow of the hot liquor passing through the conduit 186 to the flow of the white liquor passing through the conduit 180 is automatically determined. This ratio, referred to below as the H/W RATIO, affects the extent to which the white liquor is heated by the hot liquor in the heat exchanger 184. When RMODE is manual, the H/W RATIO is a predetermined constant. The program then branches to step 812.

If at step 804 the flow control mode FMODE was remote setpoint, meaning that the flow control routine 590 will use the remote setpoint automatically generated by the level control routine 570, then the program branches to step 808 where the current mode, FMODE, is compared to the previous mode, OLD FMODE, to determine whether the operator has changed the flow control mode since the previous execution of the hot tank routine 800. If the mode has not changed, then the program branches to step 812. If the mode has changed, then the program branches to step 810 at which point RMODE is changed to automatic. The program then branches to step 812 where the current flow control mode, FMODE, is stored in the OLD FMODE variable.

At step 824 the value of RMODE is tested to determine whether it is in automatic mode. If it is not, meaning that the flow control program will not use a remote setpoint, then the program branches to step 826 at which point LMODE is set to manual. The program then branches to step 832. If at step 824 RMODE was automatic, then the program branches to step 828 where RMODE is compared with the previous value of the mode, OLD RMODE. If the mode has changed, then the program branches to step 830 where LMODE is set to automatic. The program then branches to step 832.

At step 834, the current mode of the level control routine 570 is read and stored in LMODE. At step 836, the level control mode LMODE is tested to determine if it is manual. If LMODE is manual, meaning that the level control routine 570 is not to automatically generate a control signal, then the program branches to step 838 where LMODE is compared to OLD LMODE to determine whether the level control routine 570 mode has been changed by the operator since the previous execution of the hot tank routine 800. If the level control mode has not been changed, then the program branches to step 842, at which point the TRACK variable is set to active, meaning that the BIAS variable determined by the level trend routine 500 will not be stored for use as a remote setpoint by the level control routine 570. If the mode has been changed, then the program branches to step 840 at which point the mode RMODE is changed to manual. The program then branches to step 842.

If the mode of the level control routine 570 is not manual as determined at step 836, then the program branches to step 844. Steps 844-854 determine whether the value of BIAS determined by the level trend routine 500 should be ignored to prevent windup in the system. At step 844, the output of the level control routine 570, OUT, is stored in the Lout variable. At step 846, the output of the flow control routine 590, OUT, is stored in the Fout variable. At steps 848 and 850, the value of Lout is tested to determine whether it is within the range of 0 to 100%. If it is not within this range, the program branches to step 842 where TRACK is set to active.

At steps 852, 854, the value of Fout is tested to determine whether it is in the 0 to 100% range. If it is not within that range, then the program branches to step 842 at which point TRACK is set to active. At step 856 the status of the level trend routine 500 is read and stored in the variable STAT. At step 858 the value of STAT is tested to determine whether the level trend routine 500 has been disabled by the operator. If it has been disabled, then the program branches to step 842 where TRACK is set to active.

Step 860 is performed if none of the conditions tested in steps 836, 848, 850, 852, 854, and 858 are present. In this case, TRACK is set to inactive since the BIAS variable determined by the level trend routine is to be used. At step 862, the current mode LMODE of the level control routine 570 is stored in the OLD LMODE variable.

At step 864, the level trend subroutine 500 is called by the hot tank routine 800. The level trend subroutine 500 is executed as described above, and calculates the value of BIAS used as a remote setpoint by the flow control routine 570.

At step 866, RMODE is tested to determine whether it is manual. If RMODE is manual, meaning that the hot/white liquor ratio is a constant preset by the operator, then the program branches to step 872. If RMODE is not manual as determined at step 866, then the program branches to steps 868, 870 where the hot/white liquor ratio will be automatically determined based upon the output of the level control routine 570. At step 868, the output OUT of the level control routine 570 is read and stored in the OUT variable in the hot tank routine 800. The hot to white liquor ratio, H/W RATIO is then determined by multiplying OUT by a range factor KR and then adding the product to a limit factor KL.

At step 872, the flow transducer 181 measuring the current white liquor flow through the conduit 180 is read, and the white liquor flow value is stored in the variable WL FLOW. At step 874, WL FLOW is multiplied by the H/W RATIO variable to determine the hot liquor target flow, HL TARGET, through the conduit 186. At step 876, the value of HL TARGET is written to the remote setpoint of the flow control routine 590, and the hot liquor tank routine 800 ends.

White Liquor Tank Control Routine 920

Figure 12A:
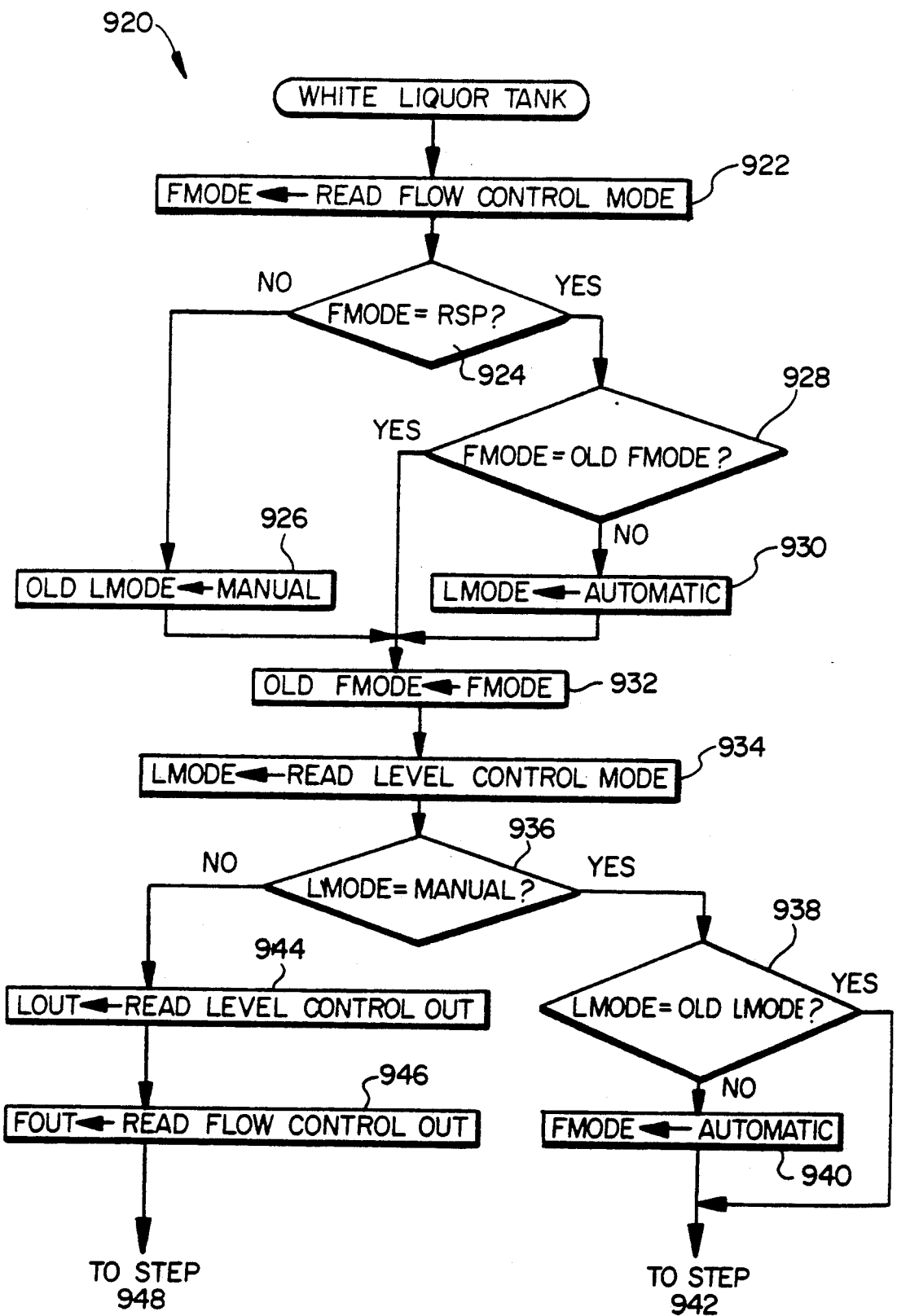
FIGS. 12a and 12b are flow charts of a white liquor tank control routine of the processing system.
Figure 12B:
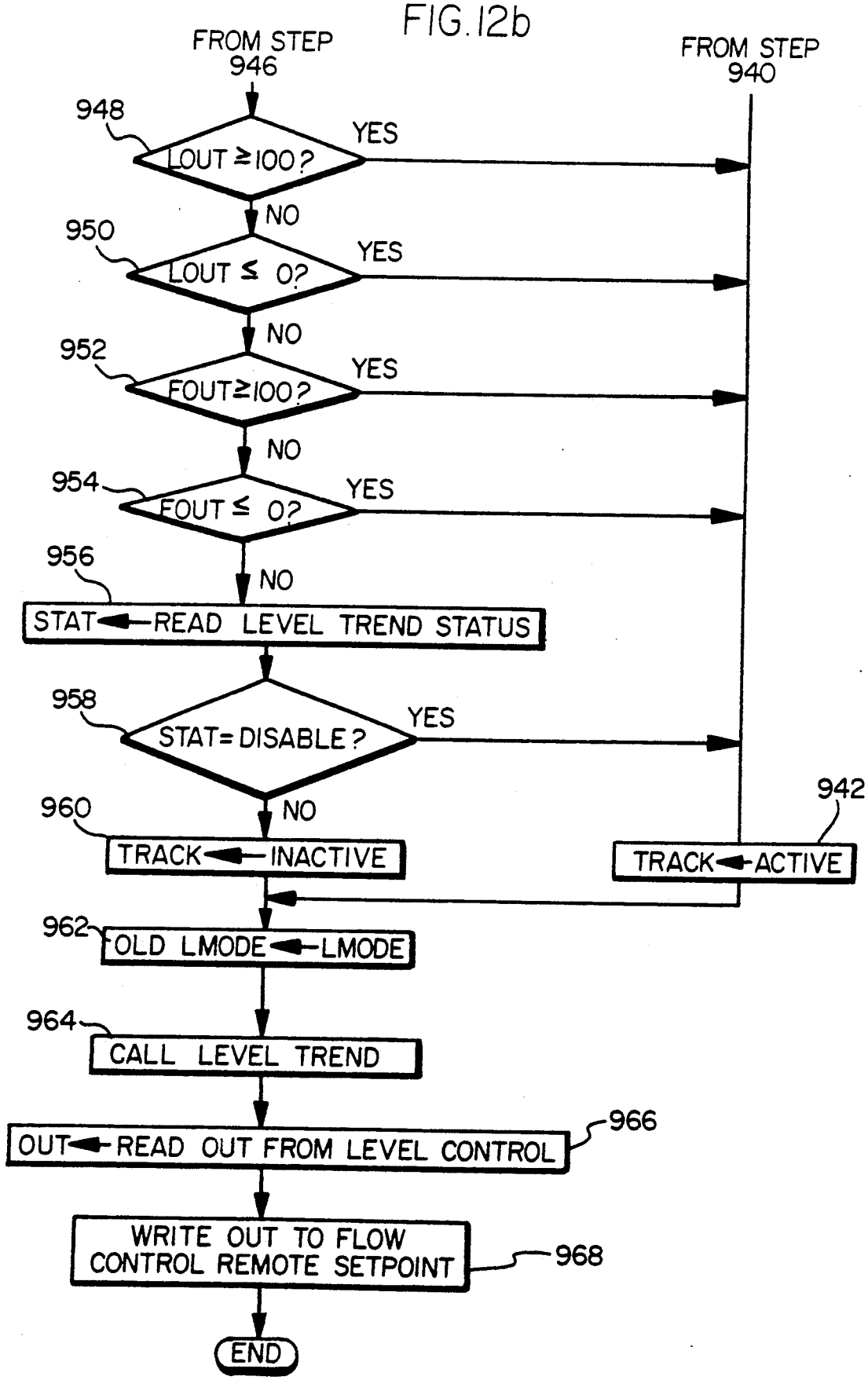

A flowchart of a software routine 920 associated with the white liquor tank 170 is shown in Figs. 12a and 12b. The basic functions of the white liquor tank routine 920 include calling the level trend routine 500 and passing information from the level control routine 570 to the flow control routine 590. The operation of the white liquor tank software routine 920 is substantially identical to that of the cool tank routine 620 described above.

Referring to FIG. 12a, at step 922 the mode of operation of the flow control routine 590 is read and stored in the FMODE variable. As described above, the mode can be manual, automatic, or remote setpoint. At step 924, the value of FMODE is tested to determine whether the flow control routine mode is remote setpoint. If it is not, meaning that the flow control routine will not use a remote setpoint generated by the level control routine 570, then the mode of operation of the level control routine 570 during the previous execution of the white liquor tank routine 920, OLD LMODE, is set to manual since the level control routine 570 does not need to automatically generate a setpoint for use by the flow control routine 590. The program then branches to step 932.

If at step 924 the flow control mode FMODE was remote setpoint, meaning that the flow control routine 590 will use the remote setpoint automatically generated by the level control routine 570, then the program branches to step 928 where the current mode, FMODE, is compared to the previous mode, OLD FMODE, to determine whether the operator has changed the flow control mode since the previous execution of the white liquor tank routine 920. If the mode has not changed, then the program branches to step 932. If the mode has changed, then the program branches to step 930 at which point the mode of the level control routine 570, LMODE, is changed to automatic so that the level control routine 570 will automatically determine the remote setpoint to be used by the flow control routine 590. The program then branches to step 932 where the current flow control mode, FMODE, is stored in the OLD FMODE variable.

At step 934, the current mode of the level control routine 570 is read and stored in LMODE. At step 936, the level control mode LMODE is tested to determine if it is manual. If LMODE is manual, meaning that the level control routine 570 is not to automatically generate a control signal, then the program branches to step 938 where LMODE is compared to OLD LMODE to determine whether the level control routine 570 mode has been changed by the operator since the previous execution of the white liquor tank routine 920. If the level control mode has not been changed, then the program branches to step 942, at which point the TRACK variable is set to active, meaning that the BIAS variable determined by the level trend routine 500 will not be stored for use as a remote setpoint by the level control routine 570. If the mode has been changed, then the program branches to step 940 at which point the mode of the flow control routine, FMODE, is changed to automatic since no remote setpoint will be used by the flow control routine 590. The program then branches to step 942.

If the mode of the level control routine 570 is not manual as determined at step 936, then the program branches to step 944. Steps 944-954 determine whether the value of BIAS determined by the level trend routine 500 should be ignored to prevent windup in the system. At step 944, the output of the level control routine 570, OUT, is stored in the Lout variable. At step 946, the output of the flow control routine 590, OUT, is stored in the Fout variable. At steps 948 and 950, the value of Lout is tested to determine whether it is within the range of 0 to 100%. If it is not within this range, then the valve associated with the flow control routine 590 is already either fully open or fully closed, and cannot be moved further in the respective open or closed position, and the program branches to step 942 where TRACK is set to active.

At steps 952, 954, the value of Fout is tested to determine whether it is in the 0 to 100% range. If it is not within that range, then the program branches to step 942 at which point TRACK is set to active. At step 956 the status of the level trend routine 500 is read and stored in the variable STAT. At step 958 the value of STAT is tested to determine whether the level trend routine 500 has been disabled by the operator. If it has been disabled, then the program branches to step 942 where TRACK is set to active.

Step 960 is performed if none of the conditions tested in steps 936, 948, 950, 952, 954, and 958 are present. In this case, TRACK is set to inactive since the BIAS variable determined by the level trend routine is to be used. At step 962, the current mode LMODE of the level control routine 570 is stored in the OLD LMODE variable.

At step 964, the level trend subroutine 500 is called by the white liquor tank routine 920. The level trend subroutine 500 is executed as described above, and calculates the value of BIAS used as a remote setpoint by the level control routine 570.

At step 966, the output, OUT, of the level control routine 570 is read and stored in the variable OUT in the white liquor tank routine 920. The white liquor tank routine 920 and the level control routine 570 run independently, with the white liquor tank routine 920 periodically reading the output OUT of the level control routine 570.

At step 968 the value stored in OUT is written to the remote setpoint of the flow control routine 590 and the white liquor tank routine 920 ends. The white liquor tank routine 920 and the flow control routine 590 also run independently without the need for synchronization. The white liquor tank routine 920 just periodically writes the output OUT to the remote setpoint of the flow control routine 590.

Displacement Tank Control Routine 1020

Figure 13A:
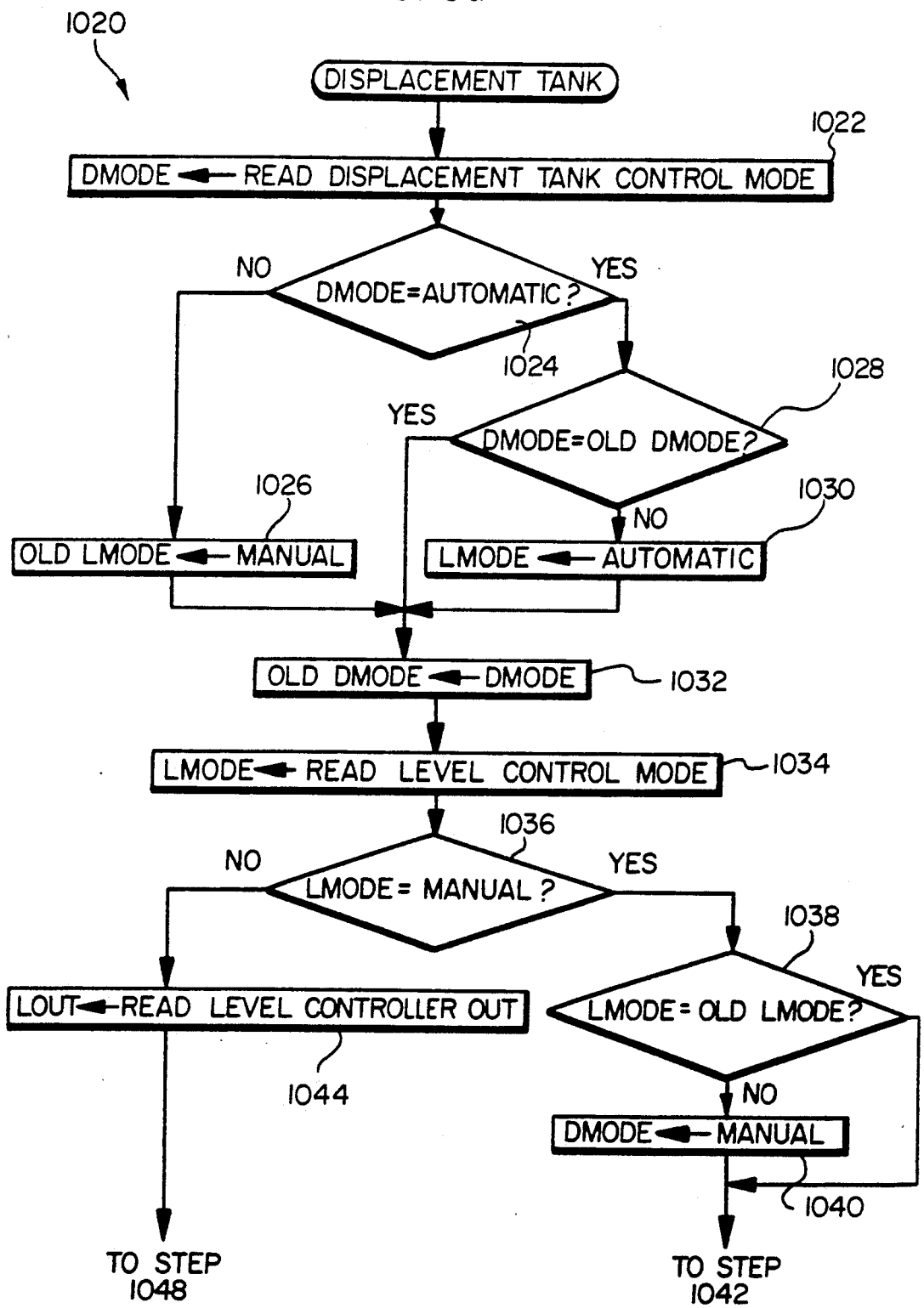
FIGS. 13a and 13b are flow charts of a displacement tank control routine of the processing system.
Figure 13B:
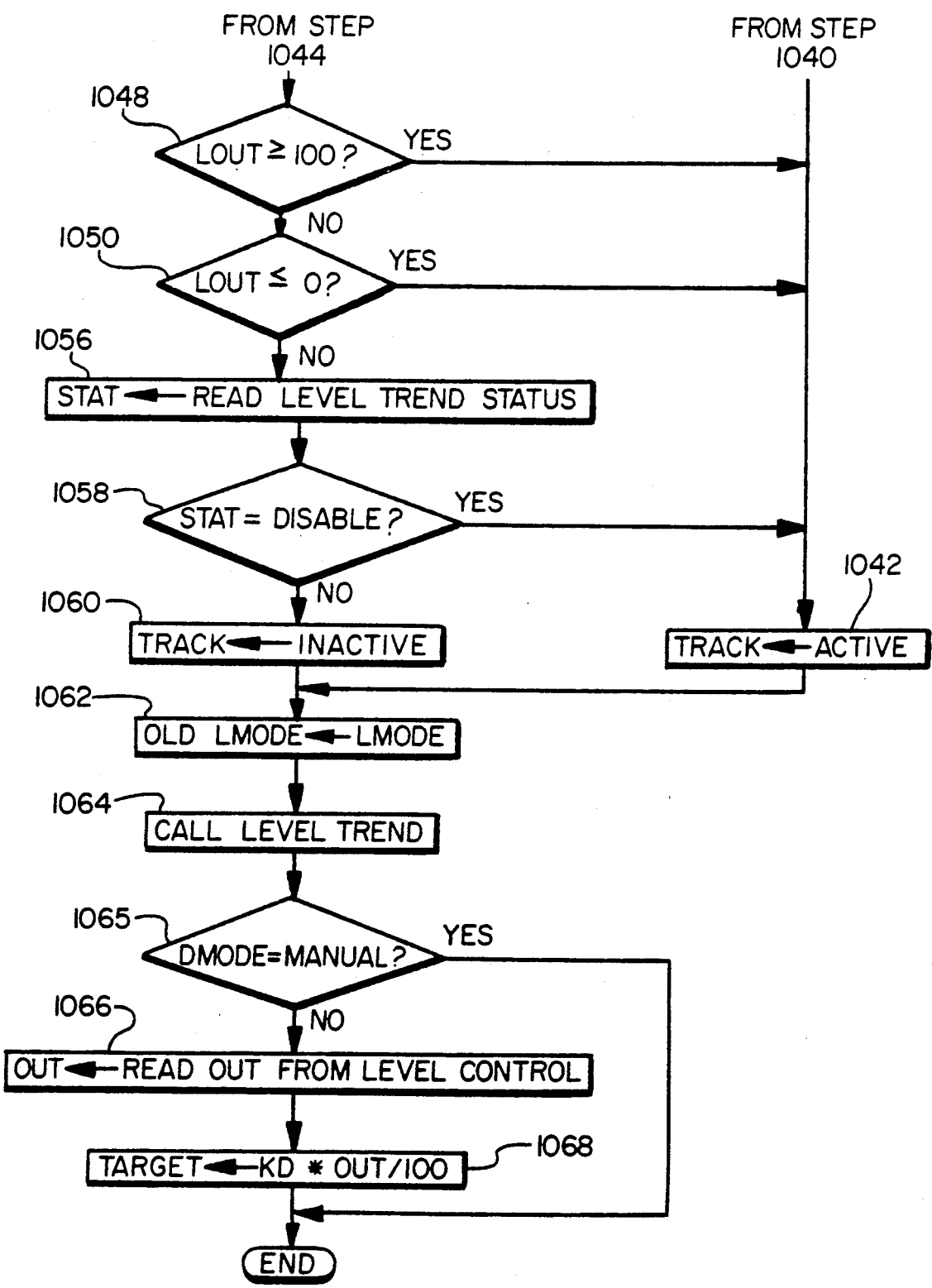

A flowchart of a software routine 1020 associated with the displacement tank 210 is shown in FIGS. 13a and 13b. The operation of the displacement tank routine 1020 is somewhat different than the operation of the four tank routines 620, 720, 800, 920 described above. The fluid level within the displacement tank 210 is controlled by automatically varying the amount of displacement fluid transmitted to the digester during the step 414 of FIG. 3. Accordingly, unlike the other tanks which have flow control routines 590 associated therewith for controlling four respective valves, the displacement tank routine 1020 has no associated flow control routine 590, but has only an associated level control routine 570. The output OUT of the level control routine 570 associated with the displacement tank 210 is used to automatically determine a displacement volume so that the operator may be relieved of that task.

Referring to FIG. 13a, at step 1022 the mode of operation of the displacement tank routine 1020 is read and stored in the DMODE variable. There are two possible modes for DMODE, a manual mode in which the operator manually determines the displacement volume or an automatic mode in which the displacement volume is determined automatically based upon the output of the level control routine 570. At step 1024, the value of DMODE is tested to determine whether the displacement control mode is automatic. If it is not, then the mode of operation during the previous execution of the displacement tank routine 1020, OLD LMODE, is set to manual. The program then branches to step 1032.

If at step 1024 the displacement control mode DMODE was automatic, then the program branches to step 1028 where the current mode, DMODE, is compared to the previous mode, OLD DMODE, to determine whether the operator has changed the displacement control mode since the previous execution of the displacement tank routine 1020. If the mode has not changed, then the program branches to step 1032. If the mode has changed, then the program branches to step 1030 at which point the mode of the level control routine 570, LMODE, is changed to automatic so that the level control routine 570 will automatically determine the remote setpoint to be used by the displacement tank routine 1020. The program then branches to step 1032 where the current displacement control mode, DMODE, is stored in the OLD DMODE variable.

At step 1034, the current mode of the level control routine 570 is read and stored in LMODE. At step 1036, the level control mode LMODE is tested to determine if it is manual. If LMODE is manual, meaning that the level control routine 570 is not to automatically generate a control signal, then the program branches to step 1038 where LMODE is compared to OLD LMODE to determine whether the level control routine 570 mode has been changed by the operator since the previous execution of the displacement tank routine 1020. If the level control mode has not been changed, then the program branches to step 1042, at which point the TRACK variable is set to active, meaning that the BIAS variable determined by the level trend routine 500 will not be stored for use as a remote setpoint by the level control routine 570. If the mode has not been changed, then the program branches to step 1040 at which point the mode of the displacement control routine, DMODE, is changed to manual. The program then branches to step 1042.

If the mode of the level control routine 570 is not manual as determined at step 1036, then the program branches to step 1044. Steps 1044–1050 determine whether the value of BIAS determined by the level trend routine 500 should be ignored to prevent windup in the system. At step 1044, the output of the level control routine 570, OUT, is stored in the Lout variable. At steps 1048 and 1050, the value of Lout is tested to determine whether it is within the range of 0 to 100%. If it is not within this range, the program branches to step 1042 where TRACK is set to active.

At step 1056 the status of the level trend routine 500 is read and stored in the variable STAT. At step 1058 the value of STAT is tested to determine whether the level trend routine 500 has been disabled by the operator. If it has been disabled, then the program branches to step 1042 where TRACK is set to active.

Step 1060 is performed if none of the conditions tested in steps 1036, 1048, 1050, and 1058 are present. In this case, TRACK is set to inactive since the BIAS variable determined by the level trend routine 00 is to be used. At step 1062, the current mode LMODE of the level control routine 570 is stored in the OLD LMODE variable.

At step 1064, the level trend subroutine 500 is called by the displacement tank routine 1020. The level trend subroutine 500 is executed as described above, and calculates the value of BIAS.

At step 1065, the mode of the displacement tank control routine, DMODE, is tested to determine whether it is in the manual mode, in which case no displacement volume will be automatically determined since the operator will select a predetermined displacement volume. In this case, the program simply ends.

If DMODE is not manual the program will branch to steps 1066, 1068 where the displacement volume is automatically determined based upon the output of the level control routine 570. At step 1066, the output, OUT, of the level control routine 570 is read and stored in the variable OUT in the displacement tank routine 020. The displacement tank routine 1020 and the level control routine 570 run independently, with the displacement tank routine 1020 periodically reading the output OUT of the level control routine 570.

At step 1068, the value stored in OUT is divided by 100 and multiplied by a predetermined constant KD to determine the displacement volume, which is stored in the variable TARGET. This automatically determined value of TARGET specifies the displacement volume that is used in the step 414 in FIG. 3.

Warm Fill Volume Routine 1100

As indicated above, the volume of warm liquor pumped from the warm liquor tank 22 to the digester 10 during step 404 in FIG. 3 is automatically determined. This automatic determination, which is based upon the displacement volume determined by the displacement control routine 1020 and other fluid volumes, obviates the need for the operator to manually determine the warm fill volume that should be used. This warm fill routine 1100 is resident in and executed by the continuous controller 244.

Figure 14:
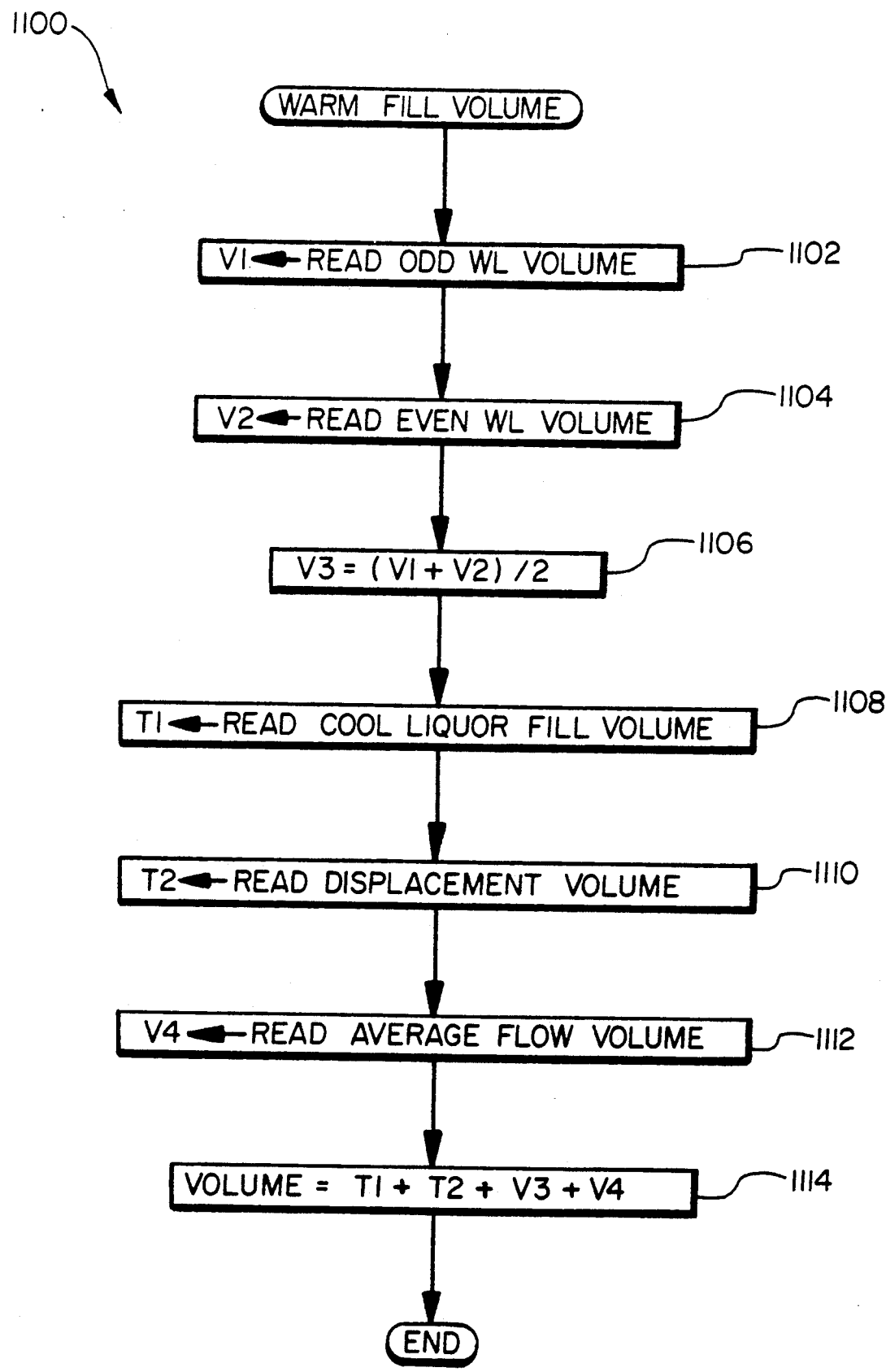
FIG. 14 is a flow chart of a warm fill volume routine of the processing system.

A flow chart of the warm fill volume routine 1100 is set forth in FIG. 14. At step 1102, the predetermined volume of white liquor that was supplied to the most recently filled odd digester (in the step 408 of FIG. 3) is stored in the variable V1. Similarly, at step 1104, the predetermined white liquor volume most recently supplied to an even digester 10 is stored in the variable V2. At step 1106, the average of these two volumes, V1 and V2, is determined and stored in the variable V3.

At step 1108, the predetermined cool liquor volume being supplied to the digesters in the step 402 of FIG. 3 is stored in the variable T1. At step 1110, the displacement volume is stored in the variable T2. This displacement volume may be a predetermined volume or the displacement volume automatically determined by the displacement tank control routine 1020. At step 1112, the average flow volume of fluid passing from the warm liquor tank 22 to the cool liquor tank 20 via the conduit 190 is stored in the variable V4. This average flow volume may be a constant whose value is based upon the product of the average flow through the conduit 190 and the cycle time. At step 1114, the warm fill volume is automatically determined by adding together the four volumes T1, T2, V3, and V4, and storing the result in the variable VOLUME, which then specifies the warm fill volume of the step 404.

Many modifications and alternative embodiments of the invention will be apparent to those skilled in the art in view of the foregoing description. Accordingly, this description is to be construed as illustrative only, and is for the purpose of teaching those skilled in the art the best mode of carrying out the invention. The details of the structure may be varied substantially without departing from the spirit of the invention, and the exclusive use of all modifications which come within the scope of the appended claims is reserved.

What is claimed is:

1. A processing system for chemically processing wood products into pulp in a plurality of digesters, said processing system including a heat recovery system, said processing system comprising:
    a plurality of digesters;
    a hot liquor tank fluidly connected to said digesters, said hot liquor tank containing relatively hot fluid generally at a first temperature;
    a warm liquor tank fluidly connected to said digesters, said warm liquor tank containing fluid generally at a second temperature, said second temperature being lower than said first temperature;
    a cool liquor tank fluidly connected to said digesters, said cool liquor tank containing fluid generally at a third temperature, said third temperature being lower than said second temperature;
    a displacement tank fluidly connected to said digesters;
    means for automatically determining a fluid volume to be transferred from one of said tanks to one of said digesters; and
    means for causing said automatically determined fluid volume to be transferred from said one tank to said one digester.

2. A processing system as defined in claim 1 wherein said automatically determined fluid volume is transferred from said warm liquor tank to said one digester.

3. A processing system as defined in claim 2 wherein said means for automatically determining a fluid volume comprises a controller that automatically determines said fluid volume based on a displacement fluid volume, a cool liquor fill volume, an average flow volume between said warm liquor tank and said cool liquor tank, and a white liquor volume.

4. A processing system as defined in claim 1 wherein said automatically determined fluid volume is transferred from said displacement tank to said one digester after wood products in said one digester have been substantially transformed into pulp.

5. A processing system comprising:
  a digester;
  a first fluid tank fluidly connected to said digester;
  a second fluid tank fluidly connected to said digester;
  a displacement tank fluidly connected to said digester;
  a controller that automatically determines a fluid volume to be transferred from one of said tanks to said digester, the automatically determined fluid volume being transferred from said one tank to said digester.

6. A processing system comprising:
  a digester;
  a hot liquor tank containing relatively hot fluid generally at a first temperature;
  a first conduit that fluidly connects said hot liquor tank to said digester;
  a first flow regulator capable of controlling fluid flow within said first conduit;
  a warm liquor tank containing fluid generally at a second temperature, said second temperature being lower than said first temperature;
  a second conduit that fluidly connects said warm liquor tank to said digester;
  a second flow regulator capable of controlling fluid flow within said second conduit;
  a cool liquor tank containing fluid generally at a third temperature, said third temperature being lower than said second temperature;
  a third conduit that fluidly connects said cool liquor tank to said digester;
  a third flow regulator capable of controlling fluid flow within said third conduit;
  a displacement tank fluidly coupled to said digester;
  a fourth conduit that fluidly connects said displacement tank to said digester;
  a fourth flow regulator capable of controlling the fluid flow within said fourth conduit; and
  a controller that automatically determines a volume of fluid to be transferred from one of said tanks to said digester, one of said flow regulators delivering said automatically determined fluid volume from said one tank to said digester.

7. A method of chemically processing wood products into pulp, said method comprising the steps of:
  (a) transferring wood products into a digester;
  (b) automatically determining a volume of fluid to be transferred from a heat recovery tank to the digester;
  (c) pumping the volume of fluid automatically determined in said step (b) from the heat recovery tank into the digester; and
  (d) allowing the fluid pumped into the digester to react with the wood products until the wood products are substantially transformed into pulp.

8. A method of processing comprising the steps of:
  (a) transferring products into a digester;
  (b) pumping a volume of processing fluid from a first tank into the digester;
  (c) pumping a volume of processing fluid from a second tank into the digester;
  (d) allowing the fluid pumped into the digester to react with the products;
  (e) automatically determining a volume of fluid to be transferred to the digester; and
  (f) subsequent to said step (d), pumping the volume of fluid automatically determined in said step (e) into the digester while a flowing excess fluid to flow out of the digester.

9. A method of processing as defined in claim 8 wherein said step (b) is performed prior to said step (c).

10. A method of processing comprising the steps of:
  (a) transferring products into a digester;
  (b) pumping a volume of processing fluid from a first tank into the digester;
  (c) automatically determining a volume of fluid to be transferred from a second tank to the digester;
  (d) pumping the volume of fluid automatically determined in said step (c) from the second tank into the digester; and
  (e) allowing the fluid pumped into the digester to react with the products.

11. A method of chemically processing wood products into pulp, said method comprising the steps of:
  (a) transferring wood products into a digester;
  (b) pumping a predetermined volume of cool liquor into the digester;
  (c) automatically determining a volume of fluid to be transferred from a warm liquor tank to the digester;
  (d) pumping the volume of fluid automatically determined in said step (c) from the warm liquor tank into the digester;
  (e) pumping a predetermined volume of hot liquor into the digester;
  (f) pumping a predetermined volume of white liquor into the digester;
  (g) allowing the fluid pumped into the digester to react with the wood products until the wood products are substantially transformed into pulp;
  (h) automatically determining a volume of fluid to be transferred from a displacement tank to the digester; and
  (i) pumping the volume of fluid automatically determined in said step (h) from the displacement tank into the digester.

12. A method as defined in claim 11 wherein the fluid volume determined in said step (c) is determined based upon a displacement fluid volume, a cool liquor fill volume, an average flow volume, and a white liquor volume.

13. A system for chemically processing wood products into pulp in a plurality of digesters, comprising:
  a plurality of digesters;
  a hot liquor tank fluidly connected to said digesters, said hot liquor tank containing relatively hot fluid generally at a first temperature and at a fluid level, said fluid level having a non-instantaneous trend;
  a warm liquor tank fluidly connected to said digesters, said warm liquor tank containing fluid generally at a second temperature, said second temperature being lower than said first temperature;
  a cool liquor tank fluidly connected to said digesters, said cool liquor tank containing fluid generally at a third temperature, said third temperature being lower than said second temperature;
  a displacement tank fluidly connected to said digesters;

a controller that determines said non-instantaneous trend of the fluid level within said hot liquor tank and controls the hot liquor tank fluid level based upon said non-instantaneous trend.

14. A system for chemically processing wood products into pulp in a plurality of digesters, comprising:
a plurality of digesters;
a hot liquor tank fluidly connected to said digesters; said hot liquor tank containing relatively hot fluid at a first temperature;
a warm liquor tank fluidly connected to said digesters, said warm liquor tank containing fluid at a second temperature and at a fluid level, said second temperature being lower than said first temperature and said fluid level having a non-instantaneous trend;
a cool liquor tank fluidly connected to said digesters, said cool liquor tank containing fluid at a third temperature, said third temperature being lower than said second temperature;
a displacement tank fluidly connected to said digesters;
a controller that determines said non-instantaneous trend of the fluid level within said warm liquor tank and controls the warm liquor tank fluid level based upon said non-instantaneous trend.

15. A system as defined in claim 14 wherein said warm liquor tank fluid level is controlled based upon factors in addition to said non-instantaneous trend.

16. A system as defined in claim 14 wherein said warm liquor tank is fluidly connected to said cool liquor tank and said warm liquor tank fluid level is controlled by adjusting the rate of fluid flow between said warm and said cool liquor tanks.

17. A system as defined in claim 16 wherein fluid flows from said warm liquor tank to said cool liquor tank.

18. A system for chemically processing wood products into pulp in a digester, comprising:
a digester;
a first tank fluidly connected to said digester, said first tank having a fluid therein at a first fluid level, said first fluid level having a non-instantaneous trend;
a second tank fluidly connected to said digester, said second tank having a fluid therein at a second fluid level, said second fluid level having a non-instantaneous trend;
a controller that automatically determines one of said non-instantaneous trends of the fluid level within one of said tanks and controls the fluid level within said one tank based upon said one of said non-instantaneous trends.

19. A system as defined in claim 18 wherein said non-instantaneous trend is determined by comparing a fluid level error determined at a first time with a fluid level error determined at a second later time.

20. A system as defined in claim 18 wherein said first tank comprises a hot liquor tank containing relatively hot fluid at a first temperature and said second tank comprises a warm liquor tank containing fluid at a second temperature, said second temperature being lower than said first temperature.

21. A system as defined in claim 20 additionally comprising a cool liquor tank fluidly connected to said digester, said cool liquor tank containing fluid at a third temperature, said third temperature being lower than said second temperature.

22. A method of processing comprising the steps of:

(a) determining a first average of a fluid characteristic within a tank over a first period to time;
(b) determining a second average of a fluid characteristic within the tank over a second period of time:
(c) determining the average of said first and second fluid characteristics determined in said steps (a) and (b):
(d) determining an average target fluid characteristic:
(e) comparing the average fluid characteristic determined in said step (c) with the average target fluid characteristic determined in said step (d);
(f) generating a control signal having a magnitude based upon the difference between the average fluid characteristic determined in said step (c) and the average target fluid characteristic; and
(g) using the control signal generated in said step (f) to control the fluid within the tank.

23. A method as defined in claim 22 wherein the control signal is generated based upon factors in addition to the difference between the average fluid characteristic determined in said step (c) and the average target fluid characteristic determined is said step (d).

24. A method as defined in claim 22 wherein the average target fluid characteristic determined in said step (d) comprises an average of a plurality of individual level setpoints.

25. A method of adjusting the fluid level within a tank, said method comprising the steps of:
(a) taking a plurality of measurements of the fluid level of a tank over a first predetermined period of time;
(b) determining a fluid level average over said first predetermined period of time based upon the fluid level measurements taken in said step (a);
(c) repeating said steps (a) and (b) to determine a plurality of fluid level averages;
(d) determining the average fluid level of the tank over a second predetermined period of time, said second predetermined period of time being longer than said first predetermined period of time, the average fluid level over said second predetermined period of time being determined from the fluid level averages determined in said step (c);
(e) determining the average target fluid level within the tank over said second predetermined period of time;
(f) determining the difference between the average fluid level of said step (d) and the average target level of said step (e); and
(g) controlling the fluid level of the tank based upon the difference between the average fluid level and the average target level as determined in said step (f).

26. A method of processing in a processing system having a digester and a plurality of heat recovery tanks, said method comprising the steps of:
(a) determining a first average of a fluid characteristic within a first heat recovery tank over a first period of time;
(b) determining a second average of a fluid characteristic within the heat recovery tank over a second period of time;
(c) determining the average of said first and second fluid characteristics determined in said steps (a) and (b):
(d) determining an average target fluid characteristic;

(e) comparing the average fluid characteristic determined in said step (c) with the average target fluid characteristic determined in said step (d);

(f) generating a control signal having a magnitude based upon the difference between the average fluid characteristic determined in said step (c) and the average target fluid characteristic; and (g) using the control signal generated in said step (f) to vary the fluid flow between the first heat recovery tank and a second heat recovery tank to automatically control the fluid within the first tank.

27. A method as defined in claim 26 wherein the average target fluid characteristic determined in said step (d) comprises an average of a plurality of individual level setpoints.

* * * * *

UNITED STATES PATENT AND TRADEMARK OFFICE
CERTIFICATE OF CORRECTION

Page 1 of 2

PATENT NO. : 5,093,773
DATED : March 3, 1992
INVENTOR(S) : Blevins

It is certified that error appears in the above-indentified patent and that said Letters Patent is hereby corrected as shown below:

Col. 1, line 27, delete "Ryyn e,uml/a/ nen" and substitute therefor --Ryynanen--.

Col. 4, line 47, delete "o portions" and substitute therefor --portions--.

Col. 5, line 3, delete "digesters" and substitute therefor --digester--.

Col. 6, line 25, delete "82" and substitute therefor --182--.

Col. 6, line 27, delete "24." and substitute therefor --24--.

Col. 9, line 15, delete "04" and substitute therefor --404--.

Col. 25, line 25, delete "00" and susbstitute therefor --500--.

Col. 25, line 45, delete "020" and substitute therefor --1020--.

UNITED STATES PATENT AND TRADEMARK OFFICE
CERTIFICATE OF CORRECTION

PATENT NO. : 5,093,773
DATED : March 3, 1992
INVENTOR(S) : Blevins

It is certified that error appears in the above-indentified patent and that said Letters Patent is hereby corrected as shown below:

Col. 28, line 9, delete "a flowing" and substitute therefor --allowing--.

Signed and Sealed this

Fifth Day of April, 1994

Attest:

BRUCE LEHMAN

*Attesting Officer*  *Commissioner of Patents and Trademarks*